United States Patent [19]

Yamagishi et al.

[11] Patent Number: 5,535,071
[45] Date of Patent: Jul. 9, 1996

[54] CASSETTE LOADING DEVICE FOR USE IN MAGNETIC RECORDING-REPRODUCTION APPARATUS

[75] Inventors: Hiromasa Yamagishi, Daito; Masahiko Takada, Hirakata; Takahiro Okuie, Nara; Osamu Takao, Kobe; Haruhiko Yoneda, Toyonaka; Akihiro Suzuki, Nishinomiya, all of Japan

[73] Assignee: Sanyo Electric Co., Ltd., Moriguchi, Japan

[21] Appl. No.: 280,454

[22] Filed: Jul. 26, 1994

[30] Foreign Application Priority Data

| Jul. 28, 1993 | [JP] | Japan | 5-185798 |
| Jul. 29, 1993 | [JP] | Japan | 5-188015 |
| Oct. 5, 1993 | [JP] | Japan | 5-249000 |

[51] Int. Cl.$^6$ .......... G11B 5/008; G11B 5/027; G11B 15/00; G11B 17/00
[52] U.S. Cl. .............. 360/96.5; 360/85; 360/95
[58] Field of Search .............. 360/96.5, 85, 95, 360/93, 92; 369/77.1

[56] References Cited

U.S. PATENT DOCUMENTS

| 4,752,845 | 6/1988 | Suzuki | 360/85 |
| 4,868,693 | 9/1989 | Tsutsumi et al. | 360/85 |
| 5,050,022 | 9/1991 | Aizawa | 360/96.5 |
| 5,218,592 | 6/1993 | Isshiki et al. | 369/77.1 |

FOREIGN PATENT DOCUMENTS

| 0331043A2 | 9/1989 | European Pat. Off. |
| 0335323A3 | 10/1989 | European Pat. Off. |
| 59-139166 | 8/1984 | Japan |
| 63-119061 | 5/1988 | Japan |
| 1-315059 | 12/1989 | Japan |
| 2210495 | 6/1989 | United Kingdom |

OTHER PUBLICATIONS

European Search Report Application No. EP 94 11 1656 Date: Jul. 13, 1995.

Primary Examiner—Stuart S. Levy
Assistant Examiner—Adriana Giordana
Attorney, Agent, or Firm—Armstrong, Westerman, Hattori, McLeland & Naughton

[57] ABSTRACT

A front mechanism mounted on a chassis loads a cassette in place by causing a first projection and a second projection on each of opposite side portions of a cassette carrying tray to slide along respective guide grooves formed in each of side plates. Power is transmitted from a drive cam gear provided on the rear side of the chassis to the tray via a drive mechanism, intermediate gear and rotary gear. For loading, the tray initially starts to move as inclined with the first projection and the second projection sliding along slanting grooves and is thereafter lowered by sliding movement of the projection along a vertical groove and sliding movement of the projection along a descent groove while being corrected from the inclined position to a horizontal position. Upon completion of cassette loading, the intermediate gear and the rotary gear constitute a Geneva stop, and the drive cam gear disengages from the drive mechanism. A support guide supporting the drive mechanism is provided by being formed by outsert molding inside the chassis and thereafter being rotated to project from a side portion of the chassis.

3 Claims, 18 Drawing Sheets

CASSETTE LOADING DEVICE FOR USE IN MAGNETIC RECORDING-REPRODUCTION APPARATUS

FIELD OF THE INVENTION

The present invention relates to a cassette loading device for use in magnetic recording-reproduction apparatus for reciprocatingly moving a magnetic tape-accommodating cassette between an insertion-discharge position and a loaded position.

BACKGROUND OF THE INVENTION

Examined Japanese Patent Publication HEI 1315059 discloses a device which is known as such a cassette loading device. In the following description, one side of the device where a rotary cylinder 800 is provided will be referred to as "front," and the other side thereof where there is a cassette insertion-discharge position as "rear."

With reference to FIGS. 21 to 23 showing the disclosed device, a chassis 100 has a pair of side plates 762, 763 thereon, and a tray 765 for holding a cassette thereon is disposed between the two side plates 762, 763 and in the rear of reel supports 200a, 200b. A top plate 775 is connected between the upper ends of the side plates 762, 763 as indicated in broken lines. A front panel 770 attached to the rear end of the chassis 100 has a height approximately equal to the height of the upper surface of the top plate 775 from the upper surface of the chassis 100.

Opposite sides of the tray 765 are bent upward to provide cassette holding plates 771, 771. Each cassette holding plate 771 has two projections 765a, 765b projecting therefrom sideways. The projections 765a, 76b fit respectively in approximately L-shaped guide grooves 764, 772 which are formed in each of the side plates 762, 763. The cassette is in an insertion-discharge position when the projections 765a, 765b are in contact with the rear ends of the respective grooved portions 764, 772. The cassette is in a loaded position when the projections 765a, 765b are brought to the lower ends of the respective guide grooves 764, 772. The guide groove 772 comprises a slanting portion 772a slanting upward toward the front and a descent portion 772b extending from the front end of the slanting portion 772a downward as slightly slanted rearward and communicating with the slanting portion 772a. The guide groove 764 comprises a slanting portion 764a approximately parallel to the slanting portion 772a and a vertical portion 764b extending threfrom.

A gear lever 780 is supported by a shaft on the right side plate 763 and has an arm 780a. The arm has a pin 787 projecting outward from its forward end. A link 785 has one end fitting to the projection 765a on the tray 765 and the other end loosely fitting to the pin 787. The link 785 is connected to the arm 780a by a tension spring 786.

A bracket 759 is attached to the outer side of the side plate 763. On the outer face of the gear lever 780, a first gear 781 is mounted on the same shaft as the lever. By meshing engagement, the first gear 781 is coupled via an intermediate gear 783 to a second gear 782 which is disposed in front of the gear 781 and supported on the inner side of the bracket 759. The second gear 782 is in mesh with a rack piece 784 disposed thereabove and interposed between the side plate 763 and the bracket 759. Flanged guides 164, 164 projecting inward from the bracket 759 fit respectively in slots 784a, 784b formed in the rack piece 784 and extending longitudinally thereof, whereby the rack piece 784 is made slidable forward or rearward. The two side plates 762, 763, first gear 781, intermediate gear 783 and second gear 782 constitute a front mechanism 760.

When the rack piece 784 slidingly moves forward, the second gear 782 rotates clockwise, rotating the first gear 781 and the gear lever 780 also clockwise. The rotation of the gear lever 780 advances the projection 765a in engagement with the link 785. The tray 765 slidingly moves as slightly inclined along the slanting portion 764a of the guide groove 764 and along the slanting portion 772a of the guide groove 772, and further descends along the vertical portion 764b of the guide groove 764 and the descent portion 772b of the guide groove 772 while correcting its inclination by rotating about the projection 765a. Upon the projections 765a, 765b reaching the lower ends of the respective guide grooves 764, 772, the cassette comes into contact with a cassette support 604 on the chassis 100.

When the first gear 781 further rotates clockwise, the gear lever 780 stretches the tension spring 786 provided between the lever 780 and the link 785, biasing the tray 765 downward through the projection 765a. Accordingly, the cassette 600 is pressed against the cassette support 604 and made ready for the subsequent tape loading.

FIGS. 24 to 25B show another device already proposed in which the tray 765 has three projections 765a, 765b, 765c projecting from a side portion thereof and engaged in a guide groove 778 in the side plate 763 or engaged with a slide piece 776 having a cam 777 (see Examined Japanese Patent Publication SHO 63-119061). The mechanism for slidingly moving the tray 765 is known and therefore will not be described, and how the tray 765 is guided will be described.

The projection 765a is provided on a rear end side portion of the tray 765, while the projections 765c, 765b are arranged obliquely upwardly away from the projection 765a. On the inner side of the side plate 763, the slide piece 776 having the cam 77 is slidably provided in engagement with slotted portions 753, 754 of the slide plate 763 which extend vertically. The cam 777 has an upper face including a horizontal portion 777a extending from the rear end of the slide piece 776 forward, a slanting portion 777b extending from the front end of the horizontal portion 777a obliquely upward and an upper horizontal portion 777c horizontally extending from the upper end of the slanting portion 777b, these cam face portions being continuous with one another. The cam 777 has a lower face which is generally parallel to its upper face but has a recessed portion 777d corresponding to the slanting portion 777b.

The guide groove 778 includes a horizontal groove 778a formed in the rear end of the side plate 763, a slanting groove 778b extending from the front end of the horizontal groove 778a and approximately parallel to the slanting portion 777b of the cam 777 and a descent groove 778c extending downward from the upper end of the slanting groove 778b, the grooves 778a to 778c being in communication with one another. The projection 765b is in contact with the upper face of the cam 777, and the projection 765c with the lower face of the cam 777. The projection 765a is slidingly movable along the guide groove 778.

When the cassette is loaded, the projection 765a moves along the horizontal groove 778a and the projection 765b along the upper face of the horizontal portion 777a, followed by movement of the projection 765a along the slanting groove 778b and movement of the projection 765b along the slanting portion 777b. Accordingly, the tray 765 moves along as inclined.

Upon the projection 765b reaching the upper horizontal portion 777c, the projection 765c reaches the recessed portion 777d with the projection 765a fitting in the slanting groove 778b. As the tray 765 advances, therefore, the tray 765 rotates clockwise about the projection 765b and has its inclination corrected to a horizontal position. With the tray in this position, the projection 765a moves down the descent groove 778c, so that the slide piece 776 descends along the slots 753, 754 for the cassette to reach a loaded position.

The cassette loading devices described have the following problems.

1. When the cassette 600 as completely loaded in position is held pressed against the cassette support 604 by the tension spring 786, the rack piece 784 is subjected to the load of holding the cassette 600 pressed. With magnetic recording-reproduction apparatus of the type described, the parts of the tape running system are driven generally by a cam mechanism for driving the rack piece 784, so that an increased load acts on the cam mechanism when the parts are driven.

2. It is strongly desired in recent years that magnetic recording-reproduction apparatus having a cassette loading device be made thinner, and it is necessary to limit the height from the upper surface of the chassis 100 to the upper end of the front panel 770. With the device shown in FIGS. 24 and 25, the tray 765 moves horizontally along the guide groove 764, so that the cassette inlet opening in the front panel 770 needs to be positioned at a higher level than the reel supports. This prevents thinning.

Further with the device shown in FIGS. 21 to 23, the inclination of the cassette is corrected by rotation about the projection 765a close to the cassette insertion-discharge side. This involves a great horizontal shift of the front end portion of the cassette 600 to result in the likelihood that the magnetic tape will become caught by guides for transporting the tape.

3. With the cassette loading device shown in FIG. 24, the cassette 600 is raised to a corrected horizontal position and thereafter lowered during loading. This reduces the clearance between the upper surface of the cassette 600 and the top plate 775 provided between the side plates 762, 763, over a large area. Consequently, there is a need to thin the top plate 775 over this area or partly cut out the top plate 775 so as to avoid the contact of the cassette with the top plate 775 while satisfying the need to thin the recording-reproduction apparatus. This results in a reduced strength.

4. If the flanged guide 164 for supporting the rack piece 784 is formed by slitting the chassis 100, the rack piece 784 is likely to engage with burrs, failing to move smoothly. A screw or the like, if used, adds to the number of parts.

As shown in FIG. 26, the flanged guide 164 may be formed on an abutment plate 161 by outsert molding using two molds 865, 866 as arranged on opposite sides of the chassis 100. The mold 865 is inserted through an opening in the chassis 100 from above, while the other mold 866 is fitted to the lower end of the abutment plate 161 and contacted with the bottom of the mold 865. A molten resin is filled into a space between the two molds 865, 866 through an injection channel 862 and cooled, whereby the flanged guide 164 is formed.

However, since the abutment plate 161 is formed by bending the chassis 100, variations in the degree of bending work accuracy entail the likelihood that the mold 866 will not smoothly fit to the abutment plate 161, presenting difficulty in molding. Furthermore, the mold 866 is likely to become caught by burrs produced on the edge of the abutment plate 161 and becomes difficult to remove.

SUMMARY OF THE INVENTION

An object of the present invention is to render the cam mechanism for operating parts of the tape running system smoothly operable without subjecting the cam mechanism to a load for holding the cassette in its loaded position.

Another object of the invention is to properly position a gear for driving the tray and a mechanism for driving the gear relative to each other in mounting the front mechanism on the chassis.

Another object of the invention is to provide a cassette loading device which is adapted to make the magnetic recording-reproduction apparatus thinner, with an increased clearance formed between the cassette inserting portion of the front mechanism and the upper face of the front panel, and without the likelihood of the magnetic tape becoming caught by parts of the tape running system.

Still another object of the invention is to provide an arrangement by which a support guide is smoothly integrally moldable on the chassis from a resin without being influenced by the bending accuracy of the chassis or burrs.

The cassette loading device embodying the present invention is so adapted that when the cassette has been completely loaded, an intermediate gear and a rotary gear are brought out of meshing engagement with each other to provide a Geneva stop, and a projecting tooth of a drive mechanism is released from a cutout in a drive cam gear. Accordingly, the force of the front mechanism to hold the tray under pressure is not transmitted to the drive cam gear, permitting the drive cam gear to rotate smoothly after the completion of cassette loading.

The front mechanism can not be mounted on the chassis unless a cutout tooth is fitted to a large gear of a pinion with the tray retracted in a cassette discharge direction. This eliminates the likelihood that the front mechanism will be mounted on the chassis in error without retracting the tray.

When the cassette is to be loaded, the tray moves obliquely upward with two projections moving along respective slanting grooves and is thereafter lowered by the movement of one of the projections along a descent groove and the movement of the other projection along a vertical groove while having its inclination thereby corrected. Accordingly, an increased space is available between the cassette inserting portion of the front panel and the upper face of the front panel, with a diminution in the region where the clearance between the top plate and the upper surface of the cassette is reduced. This assures the top plate of strength while satisfying the need to make the magnetic recording-reproduction apparatus thinner. The cassette descends with its inclination corrected to a horizontal position by rotating about the projection positioned toward the direction of cassette insertion. This diminishes the horizontal shift of the front end of the cassette, obviating the likelihood that the magnetic tape within the cassette will be caught by a part of the tape running system.

The support guide for supporting the drive mechanism is caused to project from a chassis side portion by being formed by outsert molding inside the chassis and thereafter being rotated about a fitting piece. Consequently, there is no likelihood that the mold used will be caught by burrs on the chassis side portion, while the support guide can be smoothly molded regardless of the bending accuracy of the chassis.

BRIEF DESCRIPTION OF THE DRAWINGS

FIG. 18B is a side elevation showing the support guide with the upper end of a restraining piece pushed in;

DETAILED DESCRIPTION OF EMBODIMENT

A cassette loading device will be described below with respect to the construction, operation and advantages thereof.

Brief Description of Entire Device (see FIGS. 1 to 12)

Front Mechanism

Figure 1:
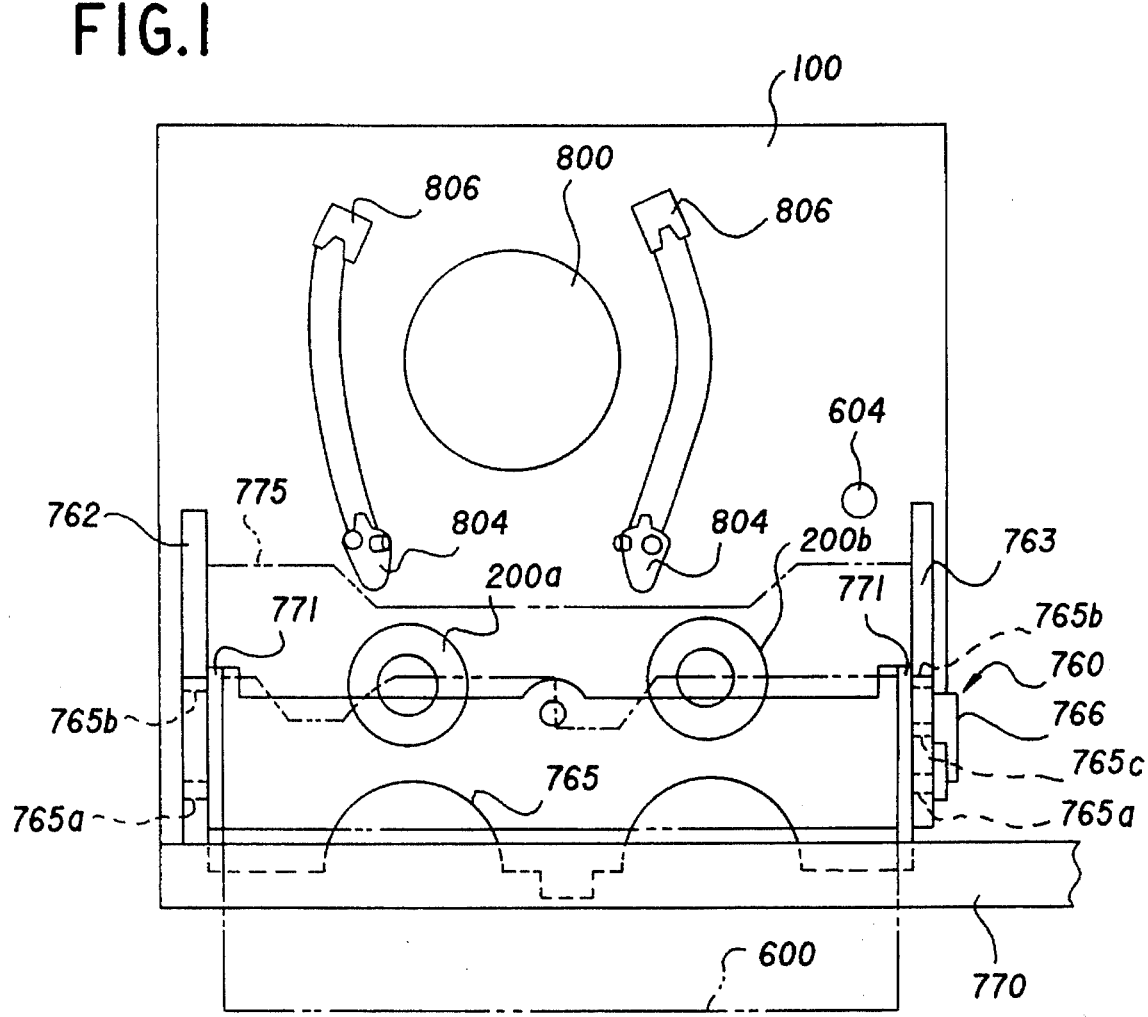
FIG. 1 is a plan view showing a front mechanism as mounted on a chassis.
Figure 2:
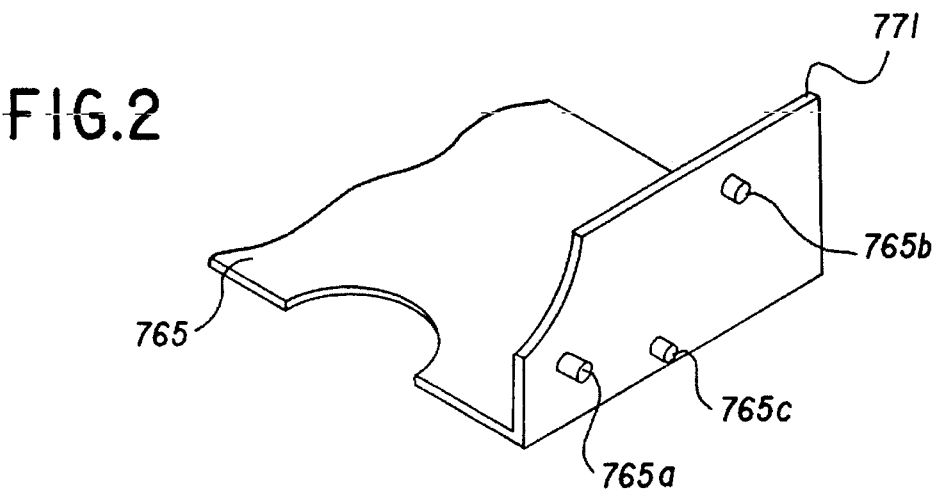
FIG. 2 is an enlarged fragmentary view of a tray of the front mechanism.

With reference to FIG. 1, a chassis 100 has mounted thereon a pair of side plates 762, 763, with a top plate 775 extending between their upper ends. A tray 765 for holding a cassette 600 thereon is provided between the side plates 762, 763. Opposite sides of the tray 765 are bent upward, providing cassette holding prates 771, 771. The holding plate 771 at the left side has two projections 765a, 765b projecting therefrom sideways, and the holding plate 771 at the right side similarly has three projections 765a, 765b, 765c. As shown in FIG. 2, the projection 765c is positioned at a lower level than the projection 765a to the front thereof. The projection 765b is positioned in front of and at a higher level than the projections 765a, 765c.

Figure 12:
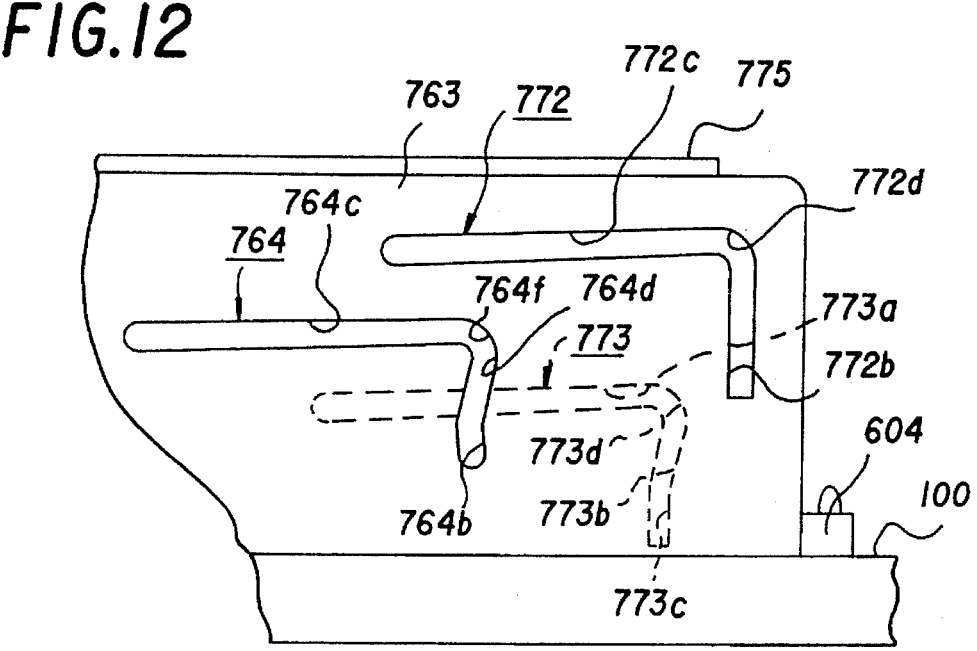
FIG. 12 is a side elevation of guide grooves and a guide groove cavity formed in a side plate.

As shown in FIG. 12, each of the side plates 762, 763 is formed with a guide groove 764 and an upper guide groove 772 for the projections 765a, 765b of the tray 765 to fit in, respectively. A guide groove cavity 773 is formed in the inner side of the right side plate 763. The projection 765c is fitted in the cavity 773. These grooves 764, 772, 773 will be described later.

Figure 3:
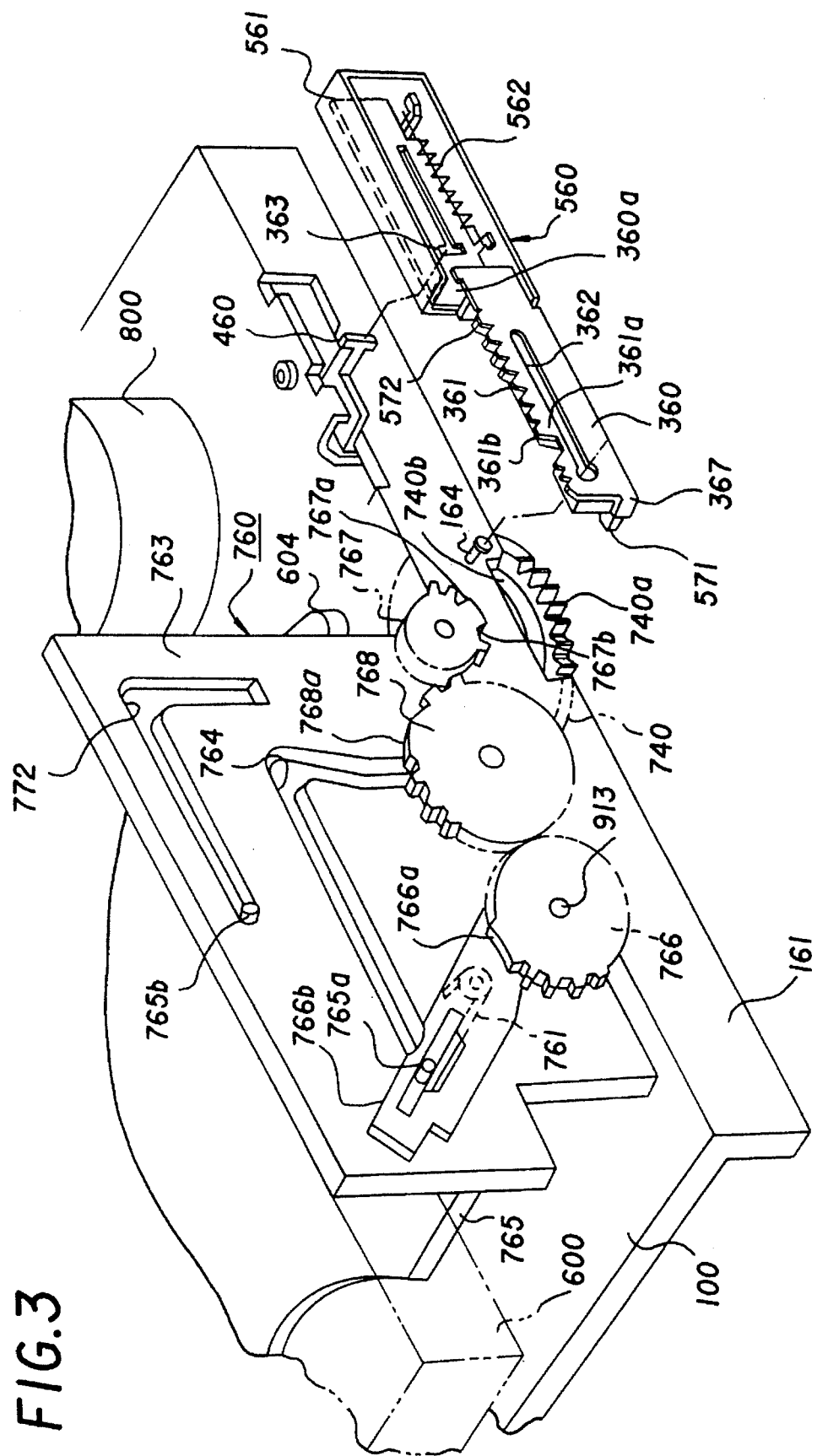
FIG. 3 is a perspective view of the front mechanism and a drive mechanism.

With reference to FIG. 3, a pinion 767 is mounted on the right side plate 763 and is in mesh with an intermediate gear 768 in the rear thereof. The pinion 767 is projected outward beyond the intermediate gear 768 and is formed with a large tooth 767a having a greater module than the other teeth thereof and a trapezoidal cutout 767b adjacent to the large tooth 767a. This tooth is formed at the pinion outer side.

The intermediate gear 768 is in mesh with a rotary gear 766 having an arm 766b fitting to the projection 765a. A torsion spring 761 fitting to the inner side of the arm 766b has one end fixed to the rotary gear 766 and the other end bearing on the projection 765a.

The rotary gear 766 is formed locally in its outer peripheral side face with a recessed portion 766a having a smooth circular arc. The intermediate gear 768 is formed locally on its outer peripheral side face with a protuberance 768a which is fittable to the recessed portion 766a on completion of cassette loading. The recessed portion 766a and the protuberance 768a constitute a so-called Geneva stop.

Figure 10:
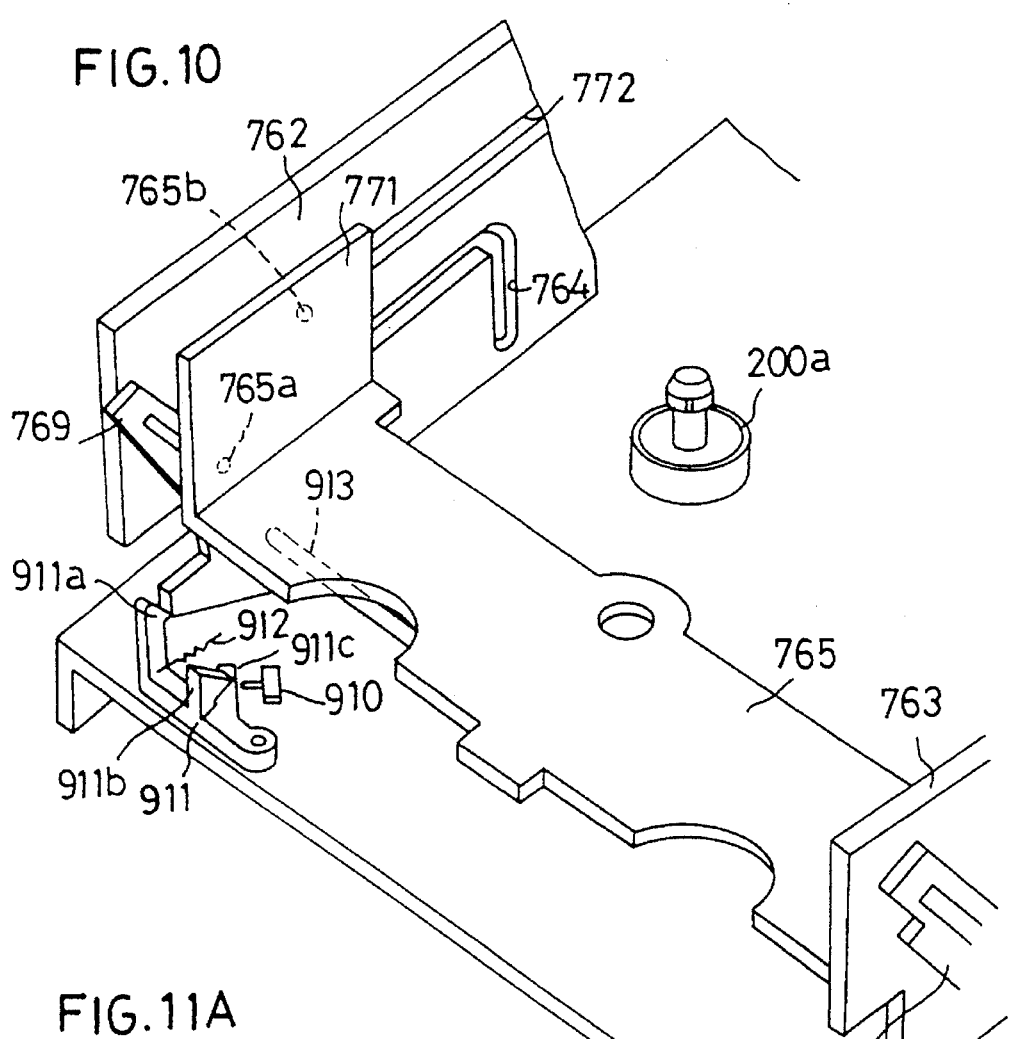
FIG. 10 is an enlarged perspective view showing an arrangement including a cassette detecting switch.

The tray 765 is provided between the side plates 762, 763. As shown in FIGS. 3 and 10, the three gears 766, 768, 767 are mounted on the side plate 763, and a driven lever 769 is attached to the side plate 762 and connected to the rotary gear 766 by a shaft 913. Thus, a front mechanism 760 is provided.

Prevention of Cassette Insertion Error

Figure 9:
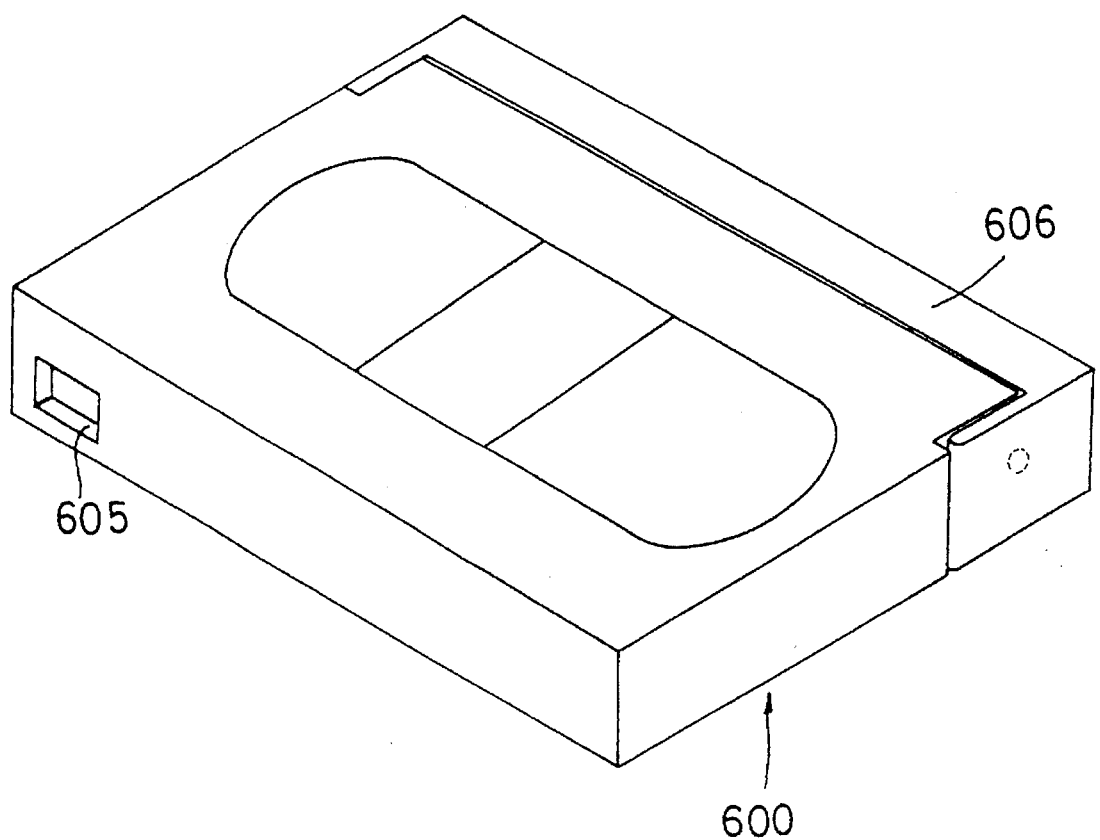
FIG. 9 is a perspective view of a cassette.

The cassette 600 to be transported by the front mechanism 760 is of the so-called VHS type and has a closure 606 which is openably provided at one end as seen in FIG. 9. The cassette is inserted into the front mechanism 760 with the closure directed toward the front. A cavity 605 for preventing a recording error is formed in the cassette 600 at a corner of the other end thereof opposite to the insertion direction. When the cassette is usable for recording, the cavity 605 is closed.

At the portion of the chassis 100 corresponding to the cavity 605 of the cassette 600 as placed onto the chassis, a switch lever 911 is disposed with one end thereof pivoted to the chassis 100 as seen in FIG. 10. The switch lever 911 is biased clockwise by a tension spring 912 and has a forward end and a midportion, from which lugs 911a, 911b project upward, respectively.

Figure 11A:
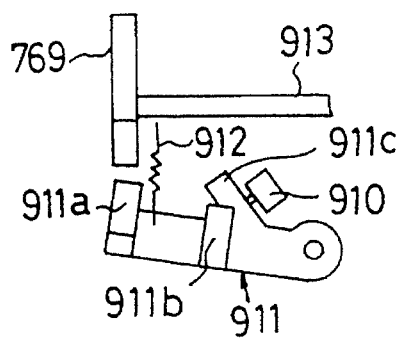
FIGS. 11A, 11B and 11C are plan views showing an operational relationship between a switch lever and the cassette detecting switch.

The lug 911b is so formed as to be fittable into the cavity 605. The lug 911a bears on the driven lever 769 fitting to the projection 765a projecting outward from the left cassette holding plate 771. In this state, a free end 911c of the switch lever 911 is away from a cassette detecting switch 910 mounted on the chassis 100 as shown in FIG. 11A. The shaft 913 about which the driven lever 769 is rotatable is connected to the center of rotation of the rotary gear 766, and the rotary gear 766 and the driven lever 769 are rotatable together.

Figure 11B:
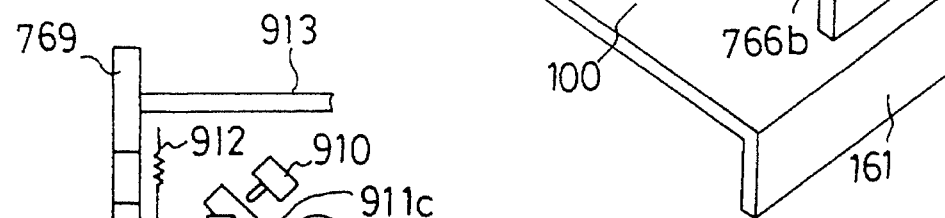
Figure 11C:
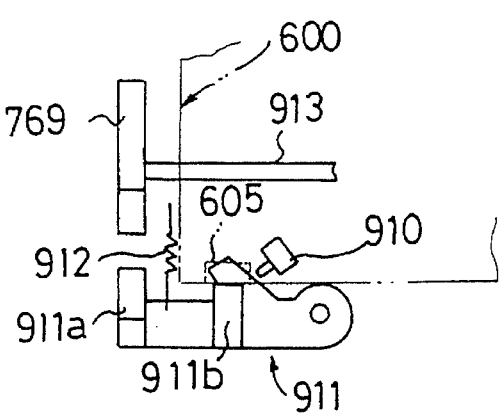

When the cassette 600 is inserted into the front mechanism, the tray 765 is pushed in, rotating the driven lever 769, so that the lever 769 moves out of contact with the lug 911a, permitting the switch lever 911 to press the cassette detecting switch 910 as shown in FIG. 11B. The switch 910 produces an ON signal, by Which the insertion of the cassette 600 is detected, whereupon a motor 515 is rotated for the start of cassette loading. When the cavity 605 is closed, the lug 911b strikes on the end face of the cassette 600, and the switch lever 911 is biased counterclockwise against the tension spring 912 to turn off the switch 910 as seen in FIG. 11C. This indicates that the cassette 600 is usable for recording. When the cavity 605 is open, the lug 911b enters the cavity 605, permitting the switch 910 to remain on. This indicates that the cassette 600 is not usable for recording.

Drive Mechanism

As shown in FIG. 3, the right end portion of the chassis 100 is bent downward to provide an abutment plate 161. Projecting outward from this plate 161 are a support guide 460, and a flanged guide 164 comprising a screw and disposed to the rear of the guide 460.

A drive mechanism 560 for driving the front mechanism 760 is fitted to the flanged guide 164 and the support guide 460 so as to be slidable forward and rearward. The drive mechanism 560 is positioned below the pinion 767 of the front mechanism 760. The drive mechanism 560 comprises a slide plate 360 having a toothed edge 361 at the upper end of a rear portion thereof and a bent contact portion 360a at its midportion, and a holder 561 in contact with the inner side face of the slide plate 360.

Figure 6:
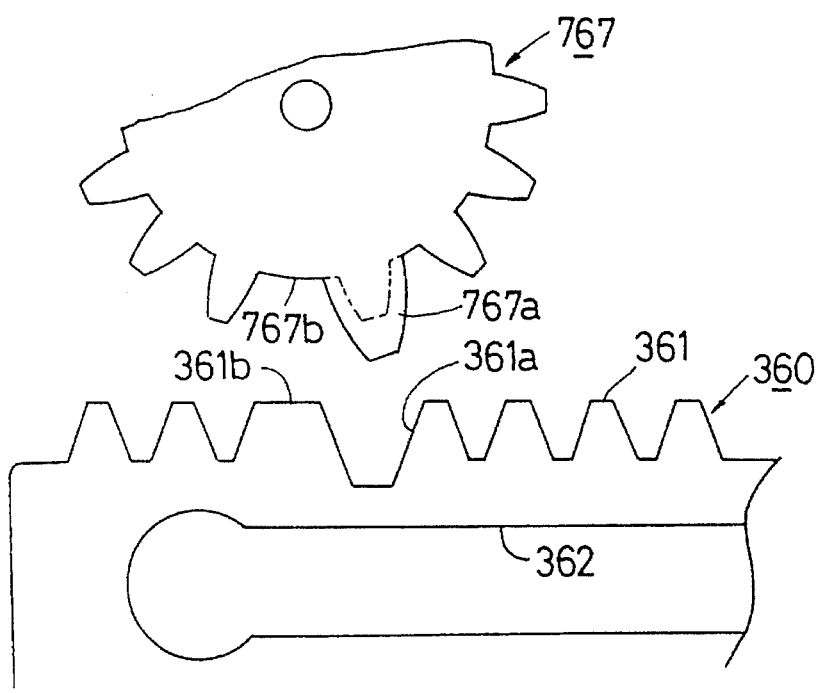
FIG. 6 is an enlarged fragmentary view of a pinion and the slide plate.

As shown on an enlarges scale in FIG. 6, the toothed edge 361 of the slide plate 360 is formed close to its rear end with a cutout tooth 361a having the same module as the large tooth 767a of the pinion 767 and meshable with the large tooth 767a. Provided adjacent to the cutout tooth 361a is a trapezoidal tooth 361b fittable to the cutout 767b.

The front half of the slide plate 360 is fitted in the front portion of the holder 561 loosely with respect to the longitudinal direction thereof. A tension spring 562 is connected between the front end of the holder 561 and the slide plate 360. The slide plate 360 is biased forward by the spring 562. A lug 367 at the rear end of the slide plate 360 bears on the rear end face of the holder 561 to restrain the plate 360 from sliding forward.

Figure 5:
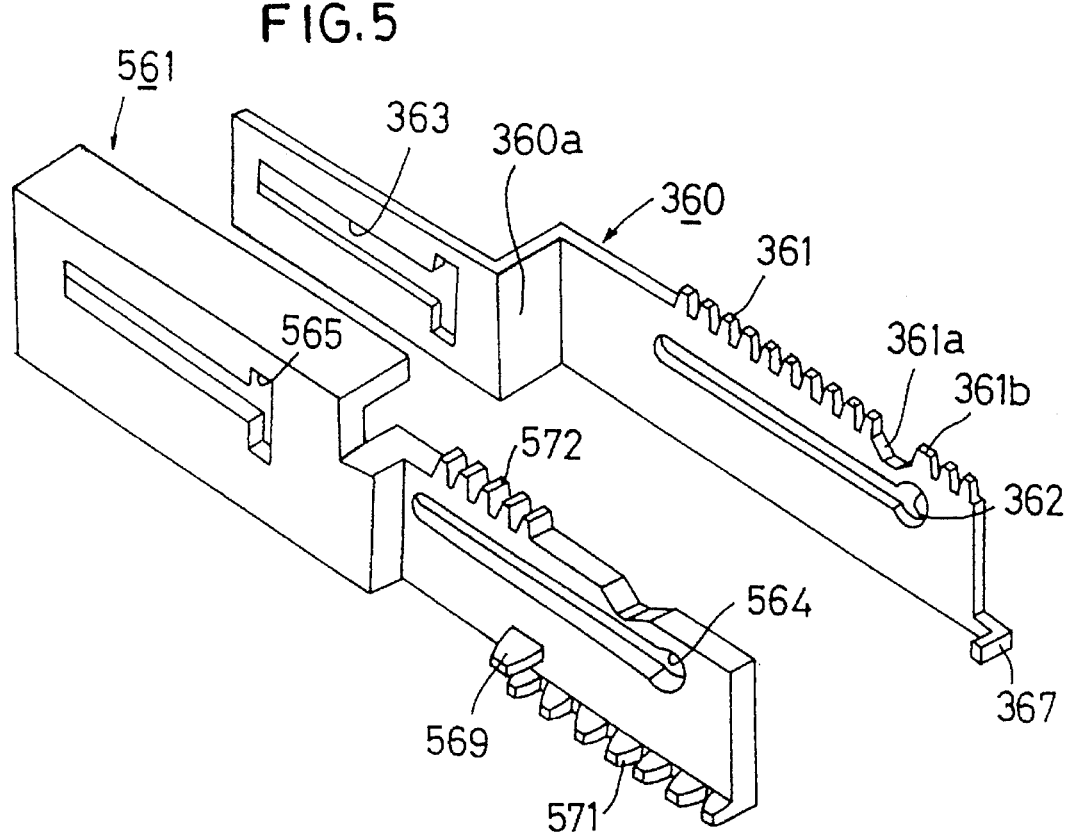
FIG. 5 is a perspective view of a holder and a slide plate.

As shown in FIG. 5, the front half and the rear half of the holder 561 are formed respectively with slits 565, 564 extending longitudinally thereof. The holder 561 has rack teeth 571 projecting inward from the bottom of a rear end portion thereof. Between the front end of the rack portion 571 and the midportion of the slit 564, a projecting tooth 569 projects inward from the holder. Rack teeth 572 having the same module as the toothed edge 361 are formed on the upper edge of the holder 561 approximately at its lengthwise midportion.

The slide plate 360 has slits 362, 363 which are identical in configuration with the respective slits 564, 565 of the holder 561. With the lug 367 held in pressing contact with the end face of the holder 561 by the tension spring 562, the slit 564 is in register with the slit 362, the slit 565 with the slit 363 and the toothed edge 361 with the rack teeth 572.

When the drive mechanism 560 and the front mechanism 760 are to be mounted on the chassis 100, first the support guide 460 is fitted into the slits 565 and 363, and the flanged guide 164 into the slits 564 and 362. The drive mechanism 560 is then slidingly moved rearward to a predetermined position. With the tray 765 completely retracted toward the cassette discharge direction, the front mechanism 760 is lowered onto the chassis 100 from above to fit the large tooth 767a of the pinion 767 to the cutout tooth 361a of the slide plate 360. At this time, the rack teeth 572 of the holder 561 are positioned in front of and spaced apart from the pinion 767. Further the projecting tooth 569 and the rack portion 571 of the holder 561 are positioned below the lower end of the abutment plate 161.

Mechanism for Operating Drive Mechanism

Figure 4:
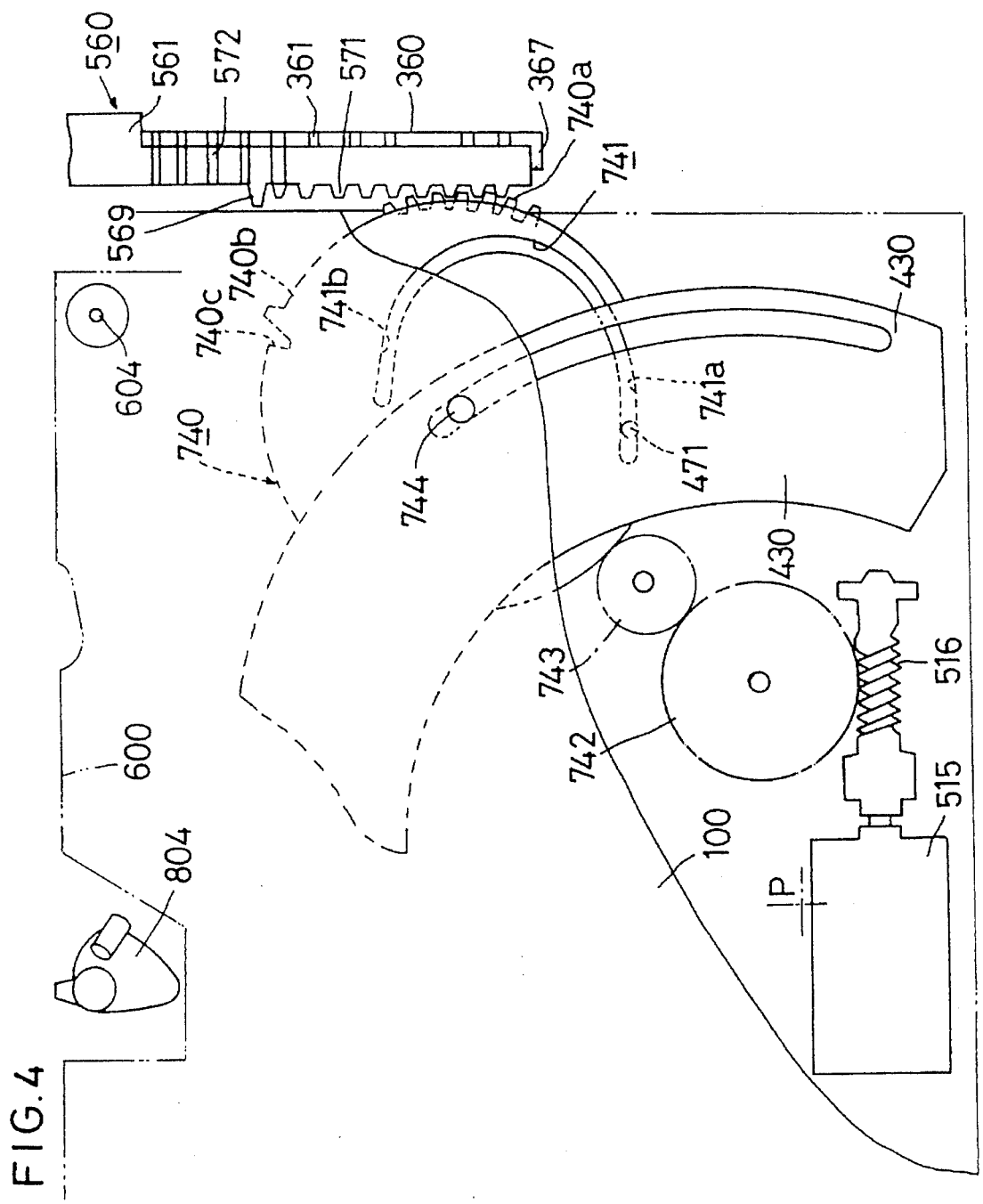
FIG. 4 is a view partly in section and showing the chassis and the drive mechanism.

With reference to FIGS. 3 and 4, a drive cam gear 740 having a toothed outer periphery 740a is mounted on a shaft 744 projecting downward from the rear side of the chassis 100. A cylindrical portion 740b having approximately the same diameter as the pitch circle of the toothed periphery 740a is formed concentrically with the periphery 740a as the upper portion, in the direction of thickness, of the drive cam gear 740. The cylindrical portion 740b is locally formed with a cutout 740c in which the projecting tooth 569 is engageable. The toothed periphery 740a of the gear 740 projects out beyond the chassis 100 to mesh with the rack portion 571 of the holder 561. The drive cam gear 740 is coupled to the motor 515 via a second intermediate gear 743, first intermediate gear 742 and worm 516 and given a torque.

The drive cam gear 740 is formed in its upper surface with a cam groove 741, which comprises a circular-arc groove portion 741a centered about the shaft 744, and a drive groove portion 741b extending from the counterclockwise end of the groove portion 741a toward the shaft 744. The upper surface of the drive cam gear 740 is opposed to a circular-arc control slide 430 which is slidable about a phantom point P along the rear surface of the chassis 100. A projection 471 extending downward from the control slide 430 fits in the clockwise end of the circular-arc groove portion 741a. The control slide 430 controls, for example, the operation of parts of a tape running system, such as leading guide blocks 804 for withdrawing the tape from the cassette 600.

Cassette Loading Operation (see FIGS. 7A, 7B, 8A, 8B, 8C, 11A, 11B and 11C)

Figure 7A:
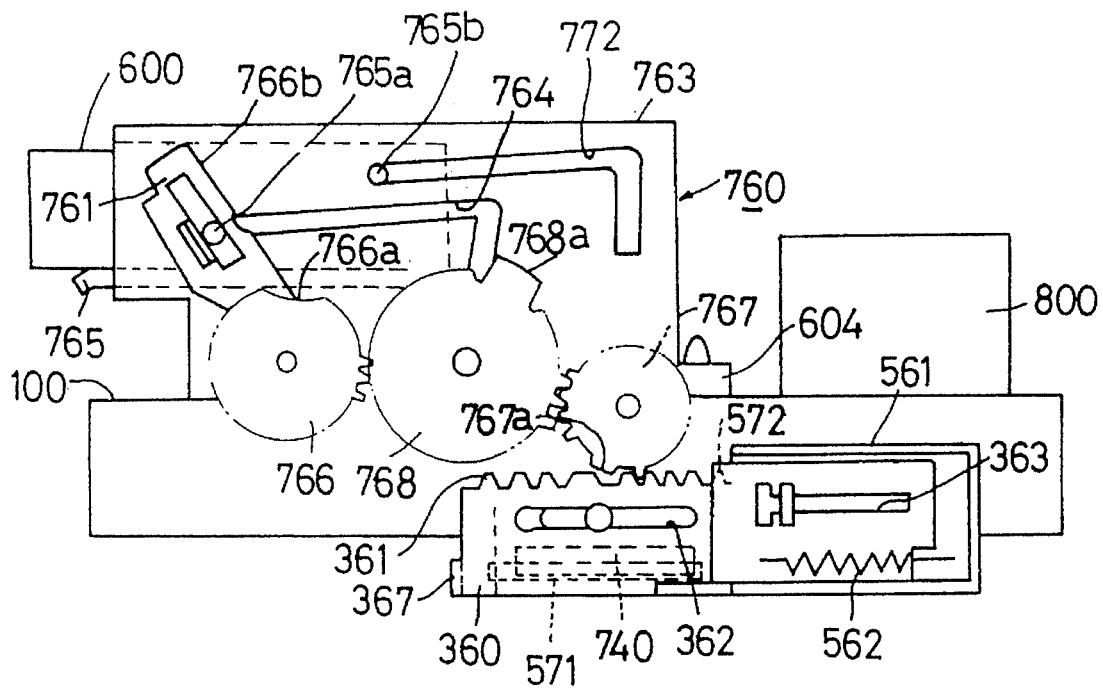
FIGS. 7A and 7B are side elevations showing how the tray is moved with a sliding movement of the drive mechanism.

With reference to FIG. 7A, when the cassette 600 is inserted into the tray 765 in a stand-by position, the tray 765 slides forward by being pushed by the cassette 600, thereby rotating the rotary gear 766 and the pinion 767 clockwise. However, since the motor 515 is out of rotation, the drive cam gear 740 does not rotate, nor does the holder 561 move. Consequently, the slide plate 360 meshing with the pinion 767 slidingly moves rearward against the tension spring 562 to move the lug 367 away from the rear end face of the holder 561.

With a further forward movement of the tray 765, the driven lever 769 shown in FIG. 10 is moved out of contact with the lug 911a of the switch lever 911. The lever 911, which is biased by the tension spring 912, pushes the cassette detecting switch 910 to turn on the switch 910, whereby the insertion of the cassette is detected, and the motor 515 is started.

The rotation of the motor 515 rotates the drive cam gear 740 shown in FIG. 4 clockwise to slidingly move the projection 471 of the control slide 430 along the cam groove 741, and rearwardly moves the holder 561 having the rack portion 571 in mesh with the gear 740.

The holder 561 comes into contact with lug 367 of the slide plate 360 to slide along with the slide plate 360. The pinion 767 meshing with the slide plate 360, and the rotary gear 766 rotate clockwise. The tray 765 slides along the guide groove 764, upper guide groove 772 and guide groove cavity 773 by being driven by the arm 766b.

Since the large tooth 767a of the pinion 767 is formed at the outer side of the toothed periphery of the pinion as previously mentioned, the large tooth 767a will not come into contact with the intermediate gear 768 during the rotation of the pinion 767.

Holding Cassette under Pressure

With the rearward movement of the drive mechanism 560, the projecting tooth 569 of the holder 561 approaches the cutout 740c of the drive cam gear 740 (see FIG. 8A), and the pinion 767 meshes with the front end of the toothed edge 361 of the slide plate 360 and the rack portion 572 of the holder 561.

Figure 7B:
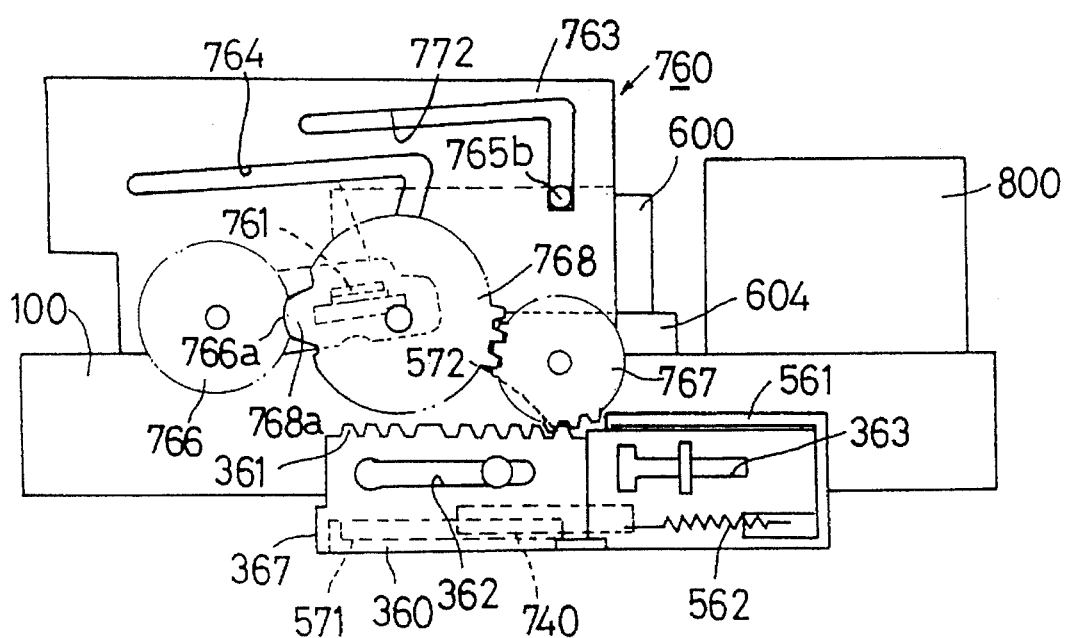
Figure 8A:
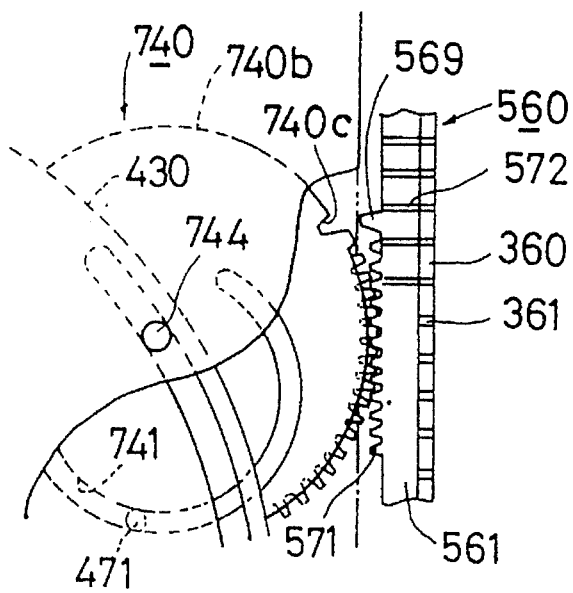
FIGS. 8A, 8B and 8C are plan views showing the drive mechanism in engagement with a drive cam gear.
Figure 8B:
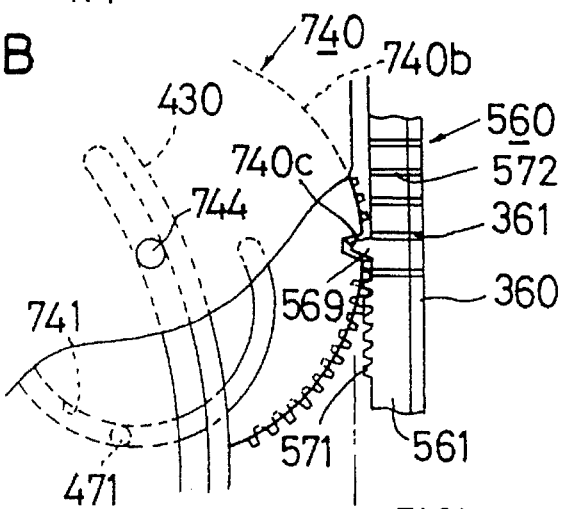

When the rotary gear 766 further rotates clockwise, the cassette 600 is placed on a cassette support 604. As seen in FIG. 7B, the torsion spring 761 fitted to the rotary gear 766 elastically deforms to depress the projection 765a of the tray 765, whereby the cassette 600 inserted in the tray 765 is pressed against the cassette support 604. As shown in FIG. 8B, the projecting tooth 569 fits to the cutout 740c of the drive cam gear 740, which moves the drive mechanism 560 further rearward.

The intermediate gear 768 further rotates counterclockwise, causing the protuberance 768a thereof to push and rotate the recessed portion 766a of the rotary gear 766 as shown in FIG. 7B. The protuberance 768a and the recessed portion 766a fit to each other in biting or wedging engagement. Upon complete fitting, these portions 768a, 766a constitute a so-called Geneva stop, with the result that the rotary gear 766 and the intermediate gear 768 stop in the fitting state. Accordingly, the cassette 600 fitted in the tray 765 is held pressed against the cassette support 604.

Figure 8C:
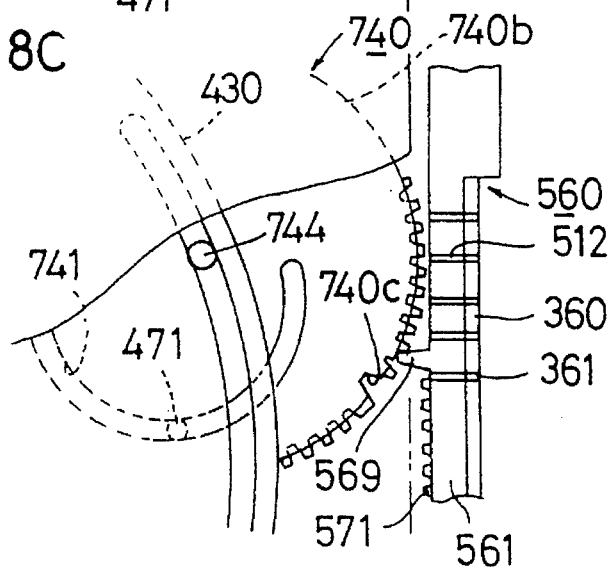

With a further clockwise rotation of the drive cam gear 740, the drive mechanism 560 slidingly moves further rearward as shown in FIG. 8C. This releases the rack portion 571 from meshing engagement with the drive cam gear 740 and disengages the projecting tooth 569 from the cutout 740c of the drive cam gear 740, whereupon the tip of the tooth 569 comes into contact with the side face of the cylindrical portion 740b. Consequently, the holder 561 ceases to move rearward. At this time, the projection 471 of the control slide 430 is positioned at the clockwise end of the circular-arc groove portion 741a.

During cassette loading, the projection 471 of the control slide 430 slides along the circular-arc groove portion 741a of the cam groove 741, so that the control slide 430 remains at rest. After the completion of cassette loading, however, the projection 471 slides along the drive groove portion 741b of the cam groove 741. The control slide 430 therefore moves counterclockwise about the point P to move parts of the tape running system, such as the leading guide blocks 804.

Cassette Unloading

The cassette 600 is removed from the front mechanism 760 by effecting movements reverse to the foregoing movements. The drive cam gear 740 is rotated counterclockwise, whereby the projecting tooth 569 of the holder 561 is engaged in the cutout 740c of the drive cam gear 740, whereupon the holder 561 moves forward. The pinion 767 rotates counterclockwise to release the protuberance 768a of the intermediate gear 768 from the recessed portion 766a of the rotary gear 766. Counterclockwise rotation of the pinion and the rotary gear 766 slidingly moves the tray 765 in the cassette discharge direction.

Correction of Inclination of Cassette during Cassette Loading (see FIGS. 12 to 15)

The guide grooves 764, upper guide grooves 772 and guide groove cavity 773 are formed in the side plates 762, 763 as shown in FIG. 12.

The upper guide groove 772 comprises a straight upper slanting groove 772c gently ascending from a rear portion toward the front, a circular-arc groove 772d curved from the front end of the groove 772c downward, and a vertical groove 772b extending from the lower end of the groove 772d downward, these grooves 772c, 772d, 772b communicating with one another.

The guide groove 764 includes a slanting groove 764c extending approximately parallel to the upper slanting groove 772c, a circular-arc groove 764f curved from the front end of the groove 764c downward, a descent groove 764d extending from the lower end of the groove 764f slightly rearwardly downward, and a vertical groove 764b extending downward from the lower end of the descent groove 764d, these component grooves being continuous with one another. The guide groove cavity 773 has approximately the same shape as the guide groove 764 and includes a slanting groove cavity 773a parallel to the slanting groove 764c, a circular-arc groove cavity 773d curved downward from the front end of the cavity 773a, a descent groove cavity 773b extending from the lower end of the cavity 773d slightly rearwardly downward like the descent groove 764d, and a vertical groove cavity 773c extending downward from the lower end of the cavity 773b, these component cavities being continuous with one another. The guide groove 764 and the guide groove cavity 773 may each include a straight portion, between the circular-arc groove 764f and the descent groove 764d and between the circular-arc cavity 773d and the descent cavity 773b, respectively, although a detailed description will not be given.

Figure 13:
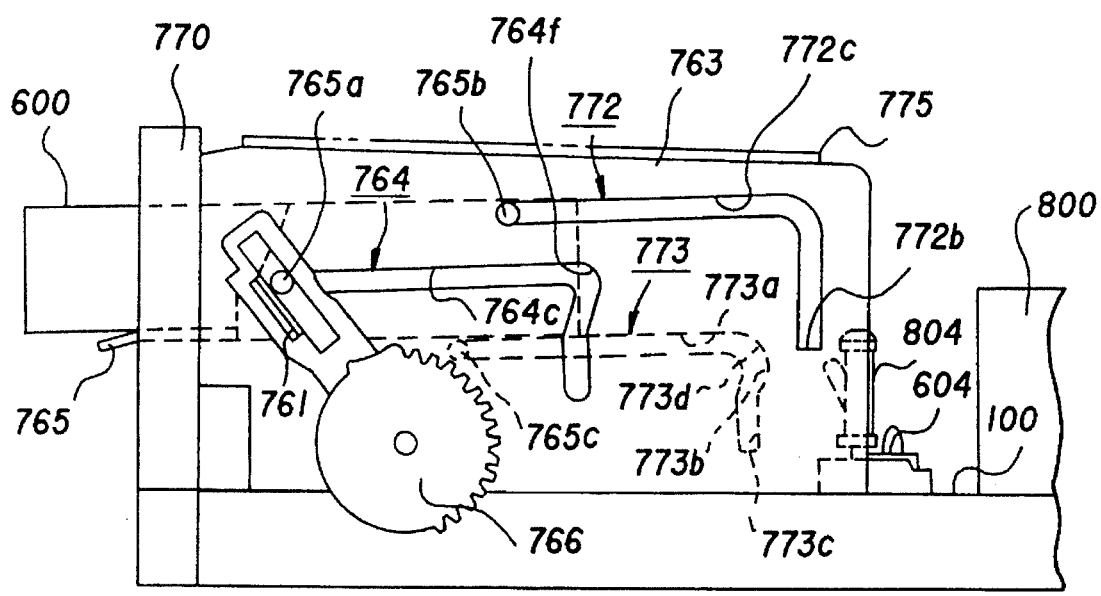
FIG. 13 is a side elevation showing the cassette as inserted into the front mechanism with an intermediate gear and the pinion omitted.
Figure 14A:
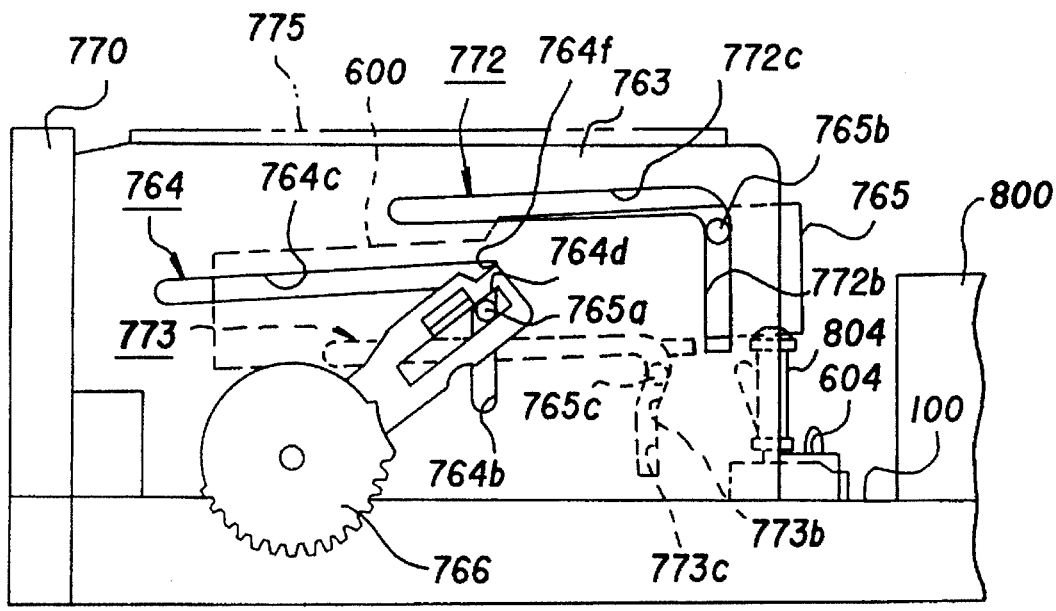
FIGS. 14A and 14B are side elevations showing the same during cassette loading.
Figure 14B:
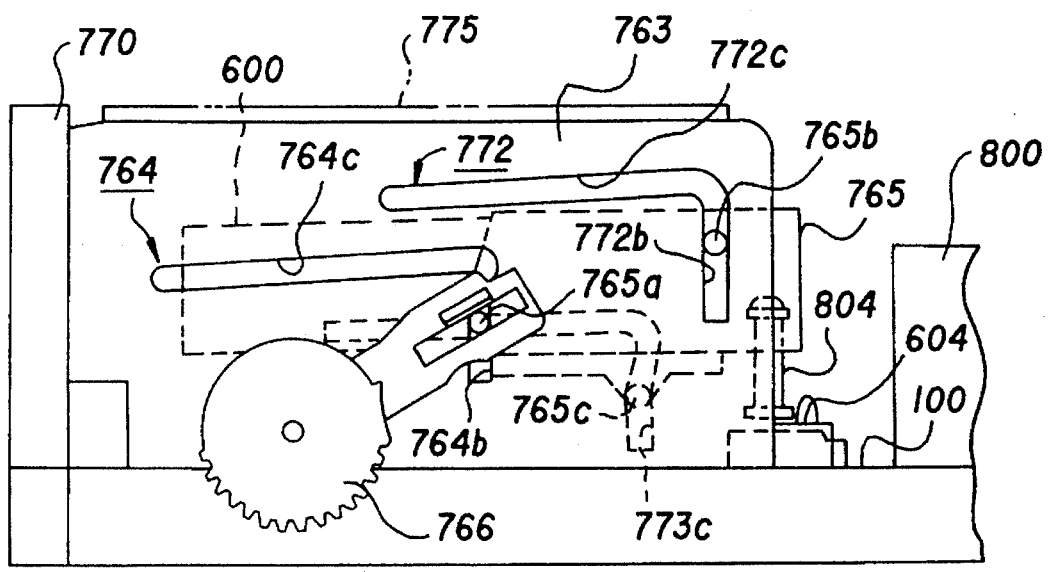
Figure 15:
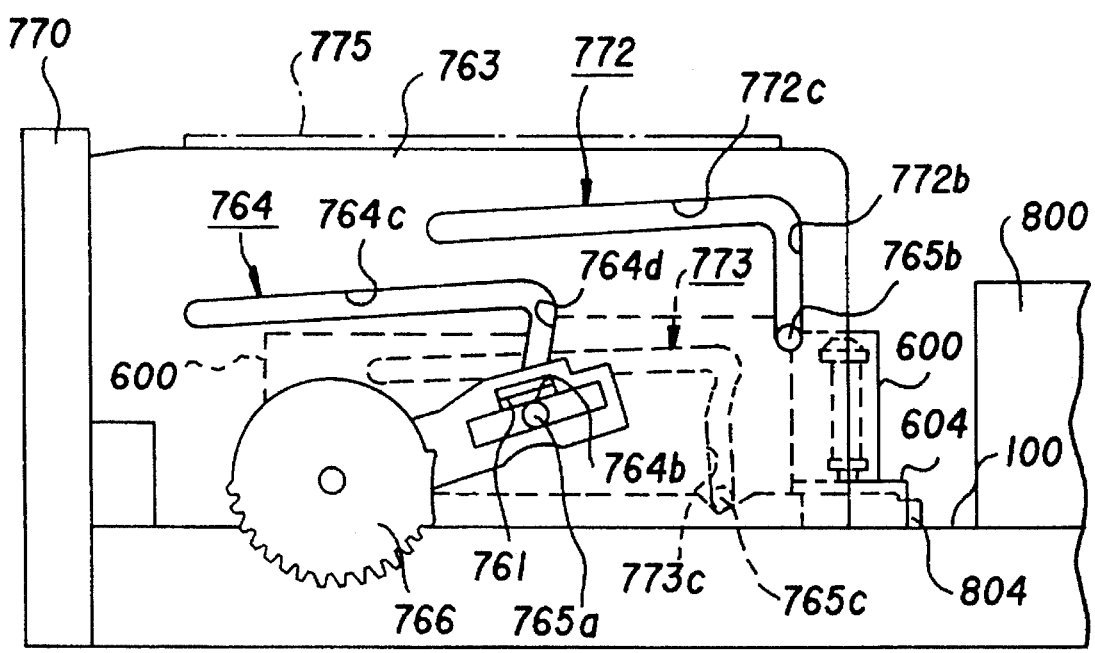
FIG. 15 is a side elevation showing the same on completion of cassette loading.

For cassette loading, the tray 765 slidingly moves as shown in FIGS. 13 to 15. First with reference to FIG. 13, the cassette 600 is inserted into the tray 765, whereupon the drive mechanism (not shown) operates and the rotary gear 766 rotates clockwise. The projection 765a slides forward along the slanting groove 764c, the projection 765b along the upper slanting groove 772c and the projection 765c along the slanting groove cavity 773a, causing the cassette 600 to move in an inclined position with its front end raised.

Upon the projection 765a moving through the circular-arc groove 764f, the projection 765a moves down the descent groove 764d and the projection 765c down the descent groove cavity 773b while being shifted rearward, and the projection 765b descends along the vertical groove 772b of the upper guide groove 772 as shown in FIG. 14A. Since the descent groove 764d and the descent cavity 773b are each positioned an increasing distance away from the vertical groove 772b as they extend downward, the tray 765 rotates in a clockwise direction about the projection 765b and moves down while having its inclination so corrected that the cassette will assume a horizontal position. When the projection 765a slides down the vertical groove 764b with the projection 765c sliding down the vertical groove cavity 773c as seen in FIG. 14B, the tray 765 is corrected from the inclined position to a horizontal position and descends with the bottom of the cassette 600 in parallel to the chassis 100 to load the cassette in position.

Thus, when loading the cassette 600, the tray 765 moves as inclined and thereafter descends while being corrected from the inclined position to the horizontal position by rotating about the projection 765b. The tray 765 is inclined in the initial stage of loading so as to give an increased clearance between the cassette inlet of the front mechanism 760 and the upper face of the front panel 770.

Support Guide for Drive Mechanism (see FIGS. 16 to 20)

The support guide 460 for supporting the drive mechanism 560 is provided on the chassis 100 by outsert molding. The support guide 460 will be described below in detail.

Figure 16:
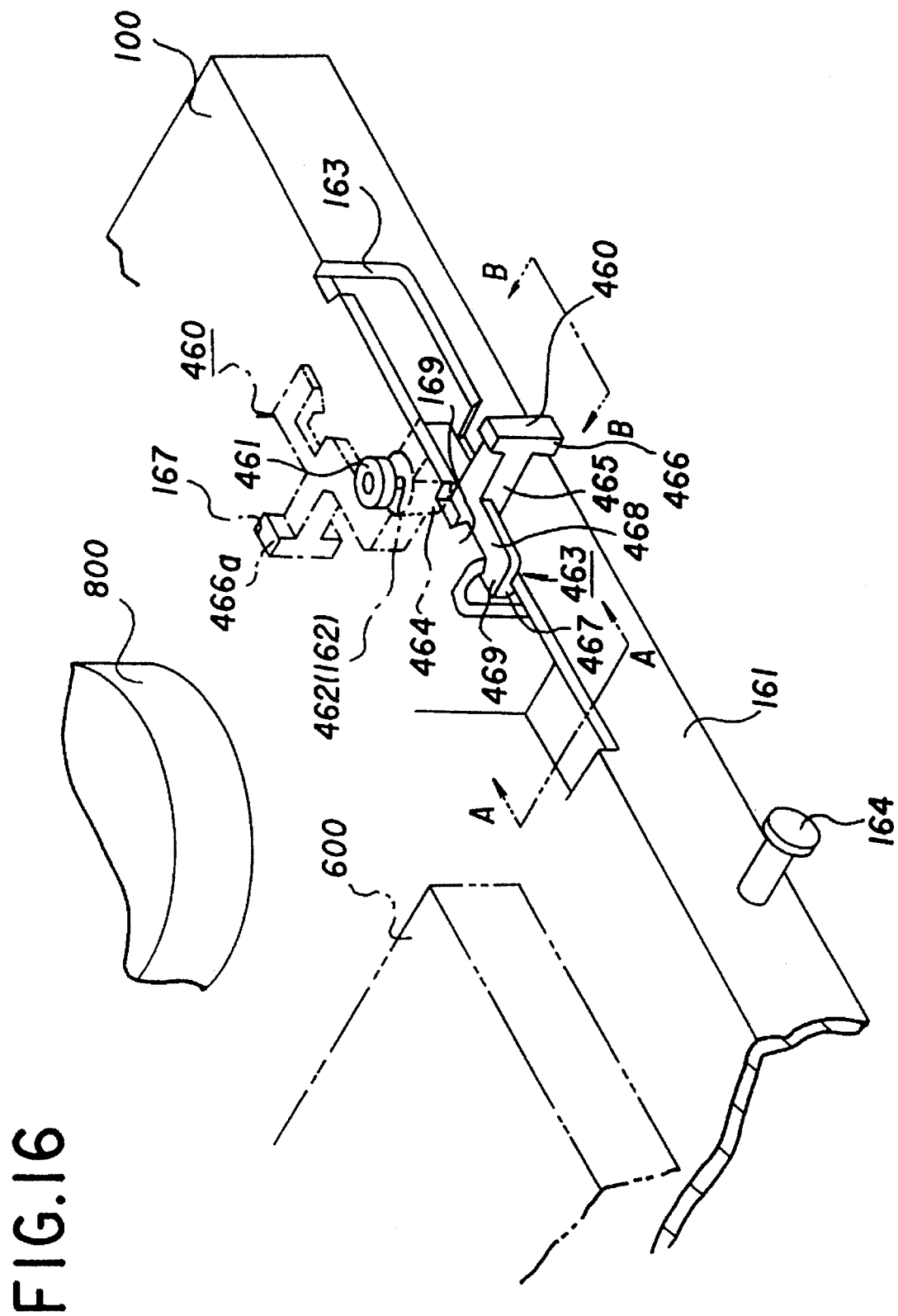
FIG. 16 is an enlarged perspective view of a support guide.

With reference to FIG. 16, the abutment plate 161 is formed in an upper end portion thereof with a cutout opening 163 having a downwardly recessed front half portion. Beneath the chassis 100, the support guide 460 projects from a position close to the abutment plate 161 outward through the cutout opening 163. The support guide 460 has a solid cylindrical support portion 464 in contact with the lower surface of the chassis 100. Horizontally extending from the support portion 464 is a guide piece 465 in contact with the lower surface of the chassis 100. The outer end of the guide piece 465 is provided with a vertically extending restraining piece 466. A fitting piece 462 projecting upward from the top of the support portion 464 extends through a circular hole 162 formed in the chassis.

A retaining piece 461 in contact with the upper surface of the chassis 100 is provided at the upper end of the fitting piece 462. The support guide 460 is rotatable about the hole 162.

At the left of the circular hole 162, the chassis 100 has a through hole 167 into which the upper end 446a is fittable and which conincides with the support guide 460 (shown in FIG. 16 in dot-dash lines) as reversely rotated to the inside of the chassis 100.

Approximately at the midportion between the support portion 464 and the restraining piece 466, an L-shaped engaging piece 463 extends from the guide piece 465 and is positioned between the rear surface of the chassis 100 and the upper edge of the abutment plate 161 defining the cutout opening 163. The engaging pirce 463 includes a rearwardly extending portion 468 and a protrusion 469 provided at the rear end of the portion 468 and directed toward the chassis 100. A hook 467 projects downward from the forward end of the protrusion 469. The hook 467 is in engagement with the inner side of the above-mentioned opening-defining upper edge to restrain the support guide 460 from rotating counterclockwise. The extending portion 468 is in contact with a stopper 169, restraining the guide 460 from rotating clockwise.

Molds for Forming Support Guide

Figure 19:
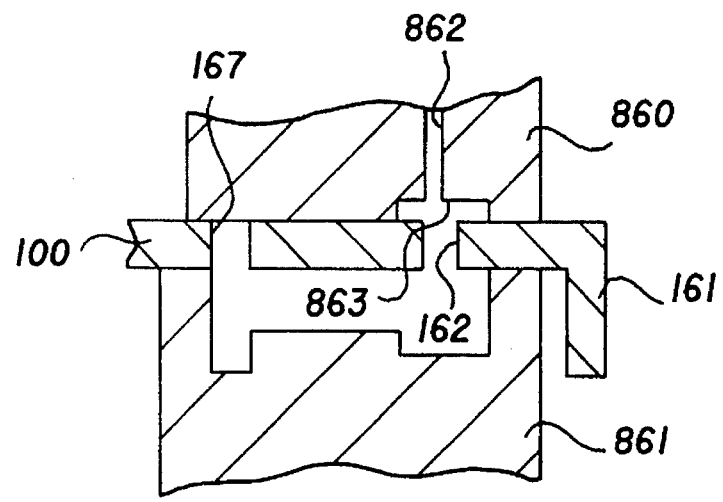
FIG. 19 is a sectional view showing molds for forming the support guide as they are seen from the direction A—A in FIG. 16.
Figure 20:
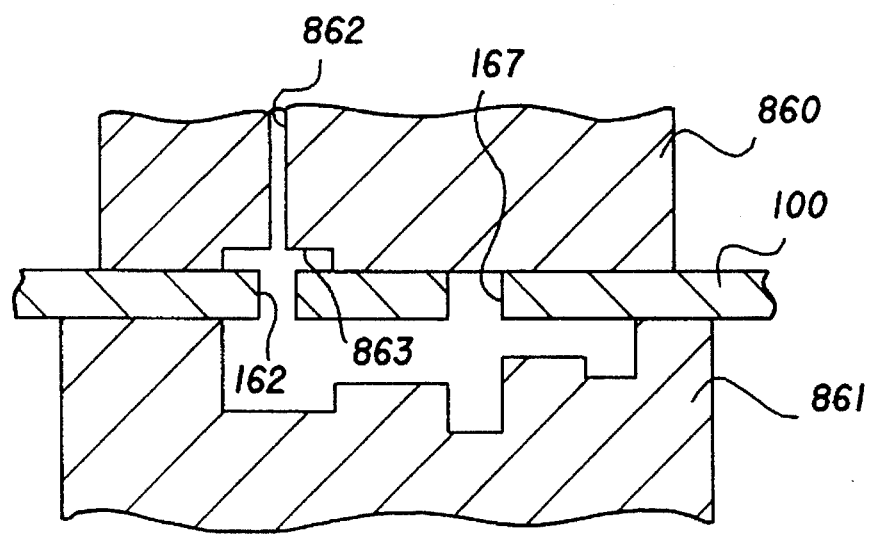
FIG. 20 is a sectional view of the same as seen from the direction of B—B in FIG. 16.
Figure 21:
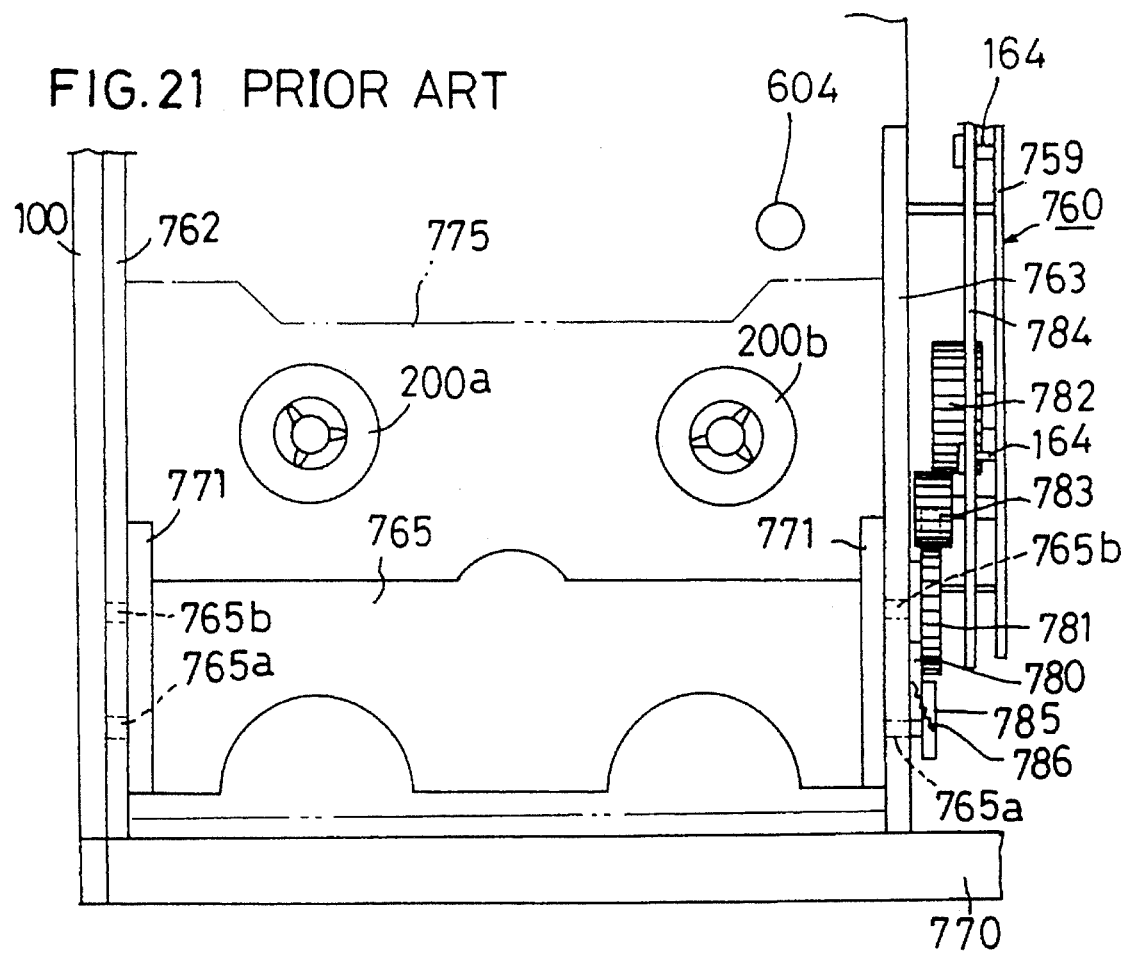
FIG. 21 is a plan view of a conventional cassette loading device.
Figure 22:
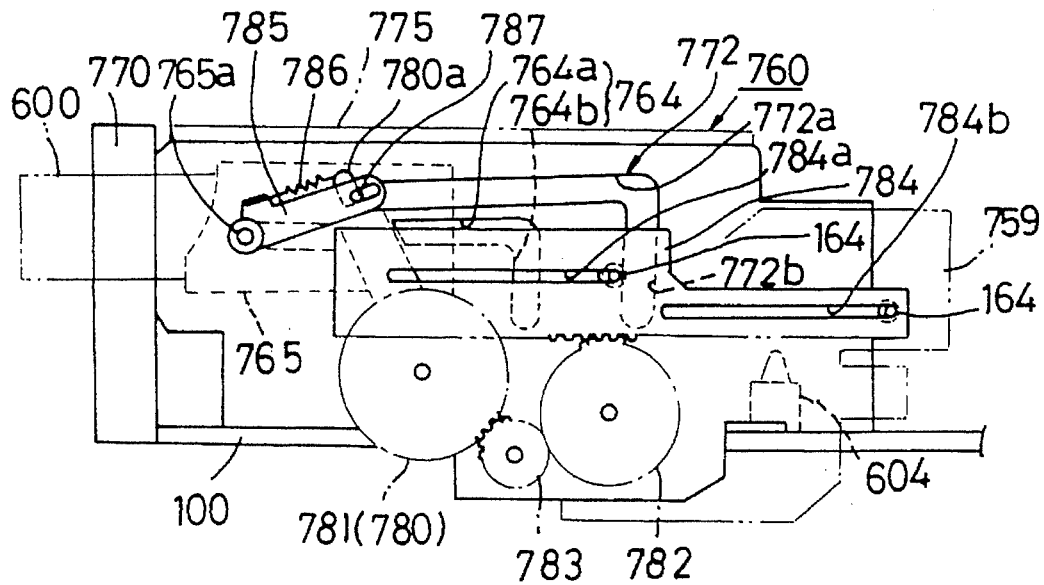
FIG. 22 is a side elevation of the same with a cassette inserted therein.
Figure 23:
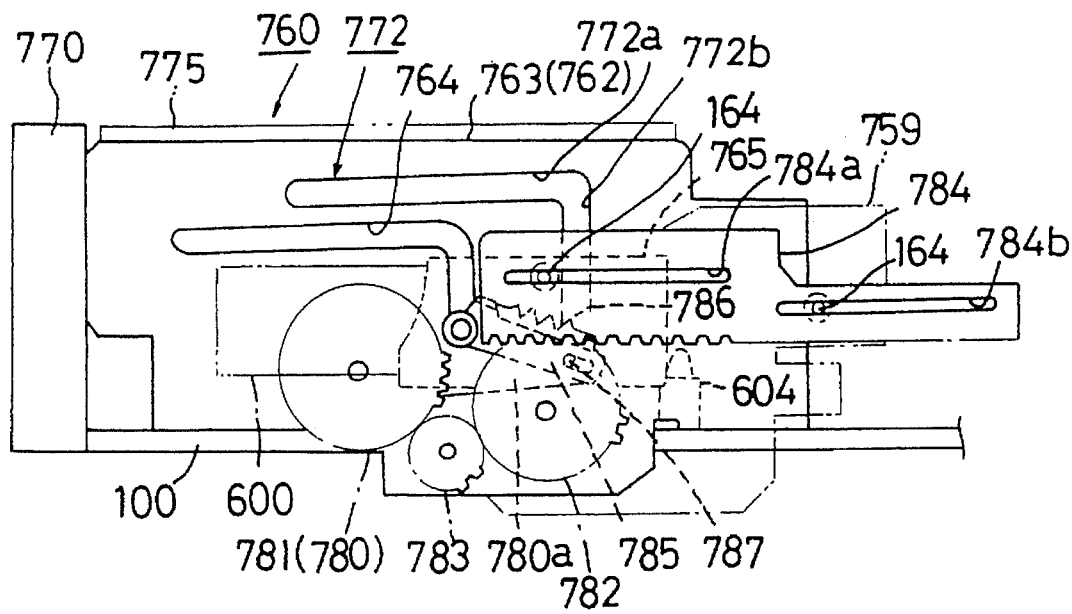
FIG. 23 is a side elevation showing the same upon completion of cassette loading.
Figure 24:
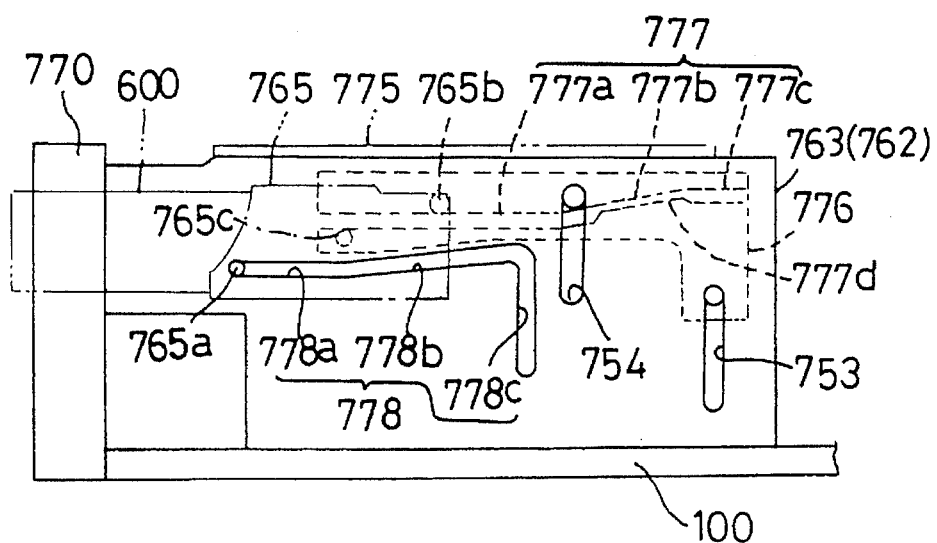
FIG. 24 is a side elevation showing another conventional cassette loading device with a cassette inserted therein.
Figure 25A:
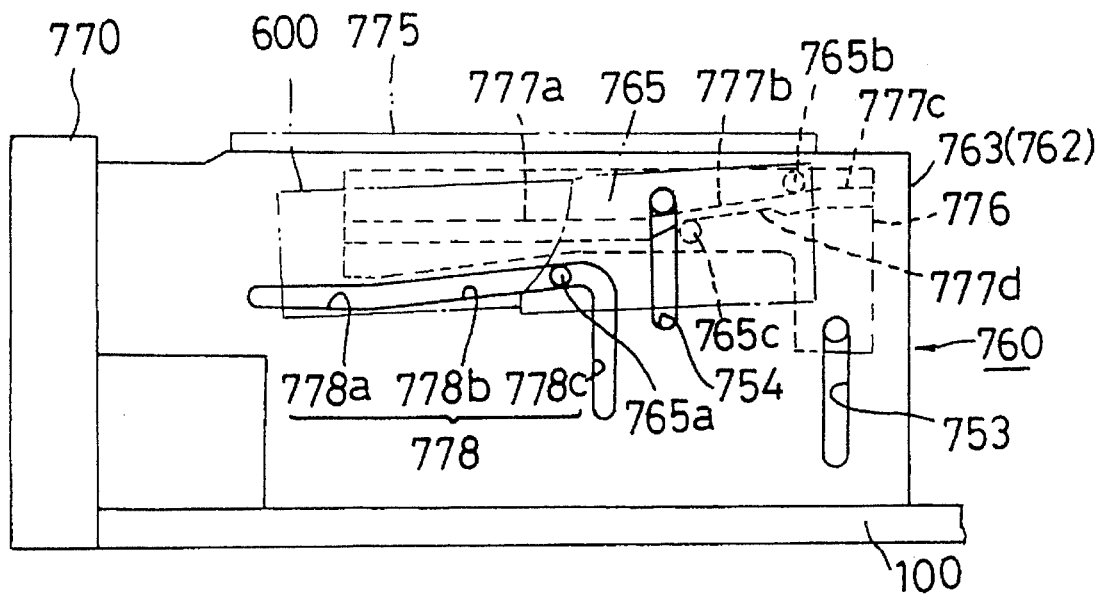
FIGS. 25A and 25B are side elevations showing the same during cassette loading.
Figure 25B:
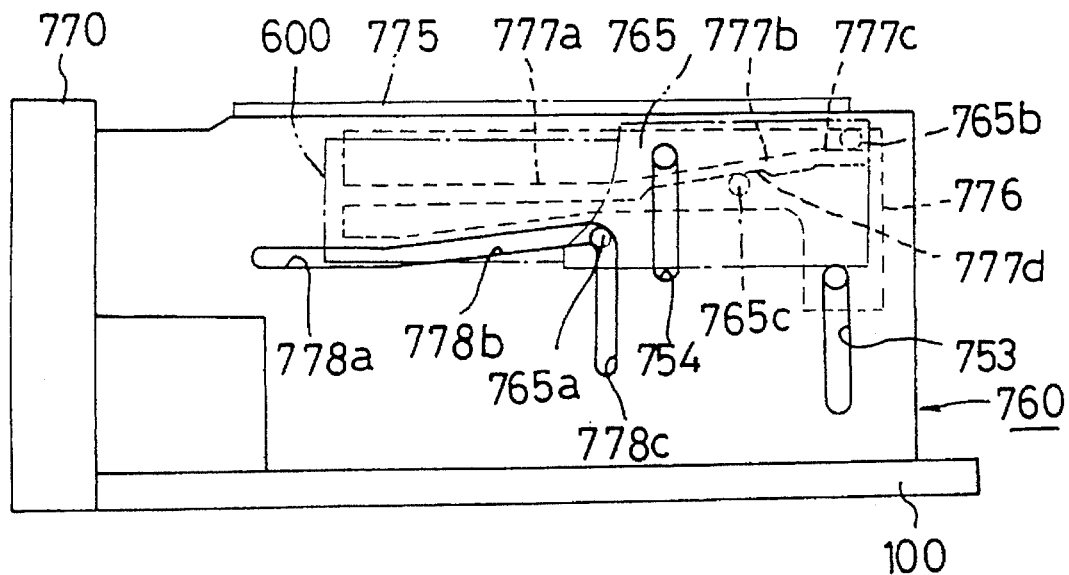
Figure 26:
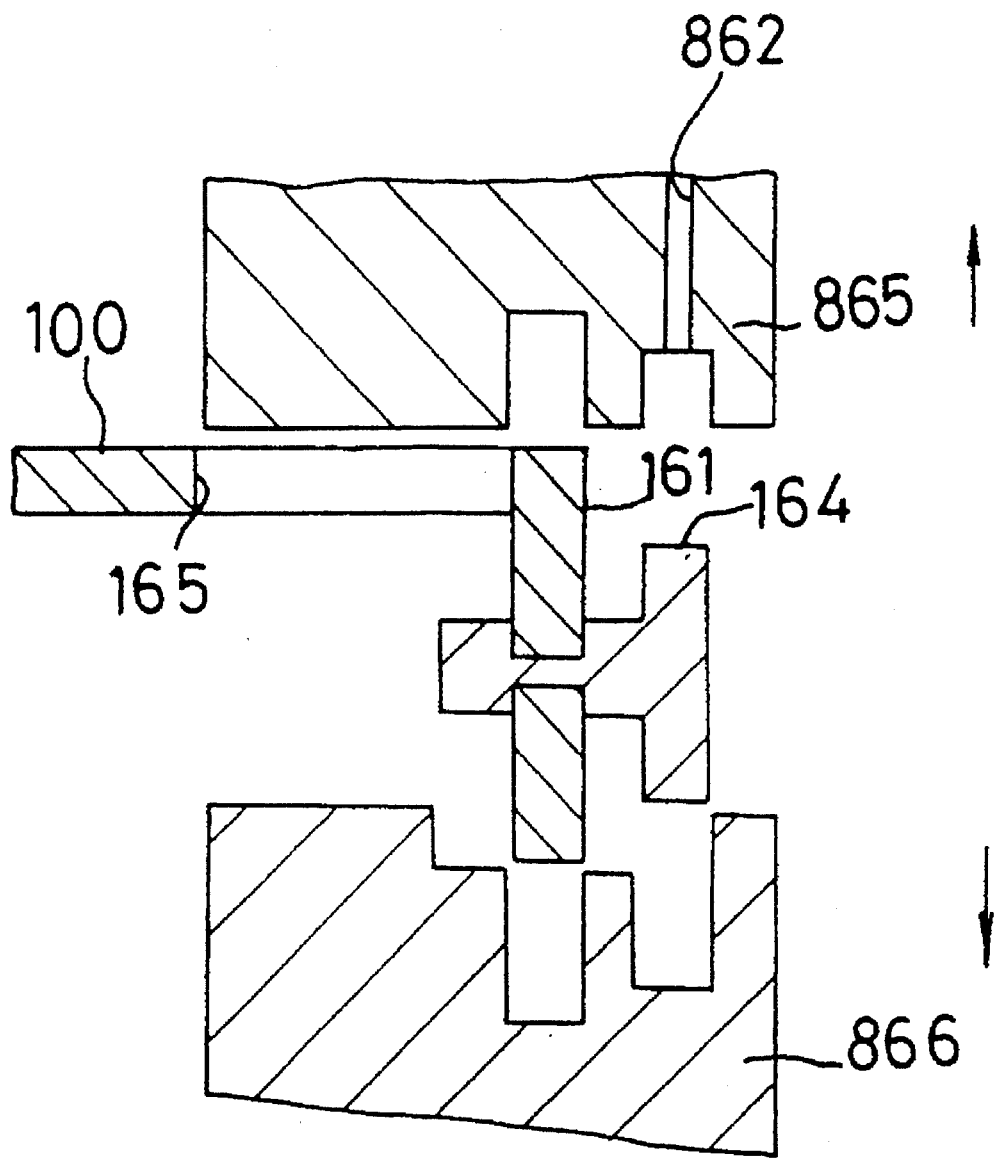
FIG. 26 is a sectional view showing a conventional arrangement of molds for forming a flanged guide by outsert molding.

The support guide 460 is integrally molded on the chassis 100 inside the abutment plate 161 using the molds shown in FIGS. 19 and 20. FIG. 19 is an enlarged sectional view showing the molds as seen from the direction A—A in FIG. 16, and FIG. 20 is an enlarged sectional view showing the molds as seen from the direction B—B in FIG. 16.

The upper mold, i.e., fixed mold 860, and the lower mold, i.e., movable mold 861, are arranged on and beneath the chassis 100 inwardly of the abutment plate 161. The bottom of the fixed mold 860 is in contact with the upper surface of the chassis 100, and the top of the movable mold 861 is in contact with the lower surface of the chassis 100. The two molds define therebetween a space for forming the support guide 460, and this space includes the circular hole 162 and the through hole 167. The bottom face of the fixed mold 860 is formed with a circular cavity 863 for molding the retaining piece 461 in contact with the upper surface of the chassis 100. The cavity 863 is in communication with an injection channel 862 for injecting a molten resin therethrough for molding.

Molding and Positioning Support Guide

Figure 18A:
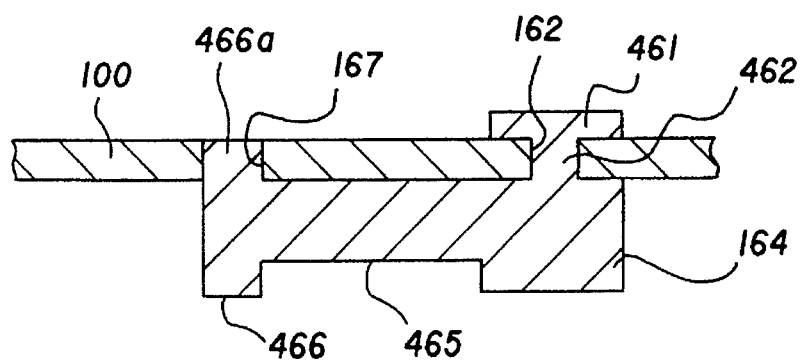
FIG. 18A is a side elevation in section of the support guide as molded.

For molding, the molten resin is injected into the space through the injection channel 862. When the molten resin filling the space is cooled, the fixed mold 860 and the movable mold 861 are released from the resulting molding. As shown in FIG. 18A, the support guide 460 is formed as held to the chassis 100 by the fitting piece 462 and the retaining piece 461 joined to the piece 462. The upper face of the guide piece 465 is in contact with the lower surface of the chassis 100, with the upper end 466a of the restraining piece 466 fitting in the through hole 167.

Figure 17:
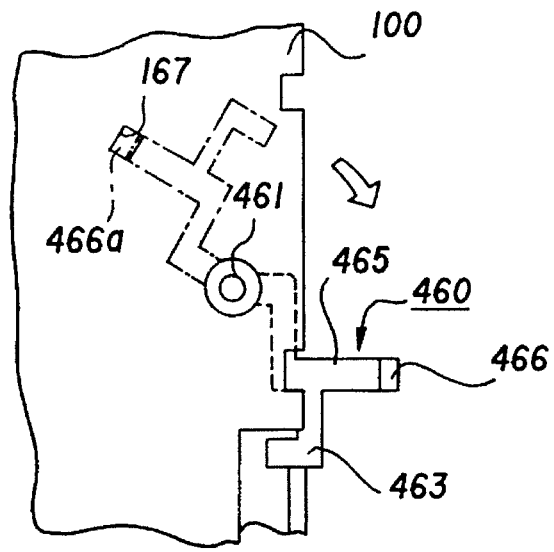
FIG. 17 is a fragmentary plan view of the same.

In this state, the support guide 460 is positioned as rotated about the circular hole 162 counterclockwise from the position where the support guide 460 is to be used with the holder 561 attached thereto as indicated in dot-and-dash lines in FIGS. 16 and 17.

Figure 18B:
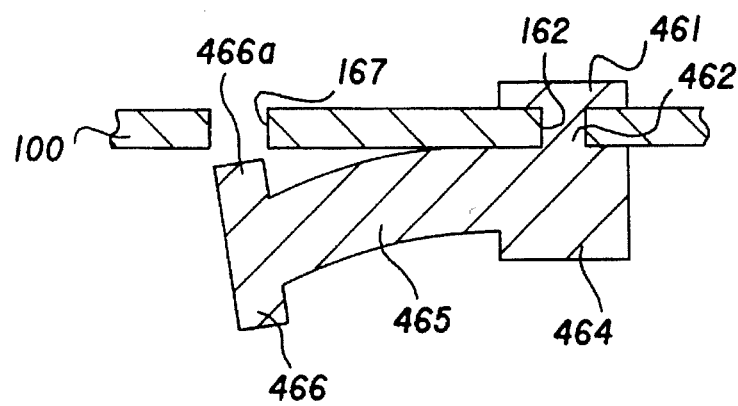

After the support guide 460 has been integrally molded on the chassis 100, the upper end 466a of the restraining piece 466 fitting in the through hole 167 is pushed in and released from the hole 167 as shown in FIG. 18B. The restraining piece 466 as removed from the chassis 100 is rotated clockwise about the fitting piece 462 as seen in FIG. 17.

The upper end of the restraining piece 466 revolves in contact with the lower surface of the chassis 100. The restraining piece 463 and the guide piece 465 leave the chassis 100, and the forward end of the engaging piece 463 reaches a position in the vicinity of the abutment plate 161. The engaging piece 463 as positioned on the rear side of the chassis 100 is slightly bent upward to cause the hook 467 to be caught by the inner side of the upper edge defining the cutout opening 163, whereupon the hook 467 engages with the opening-defining edge owing to the resiliency of the engaging piece 463 to restrain the support guide 460 from rotating counterclockwise.

Thus, the support guide 460 can be provided in position for supporting the drive mechanism 560 by rotating the support guide 460 clockwise after molding.

Although the drive mechanism 560 is supported by the support guide 460 and the flanged guide 164 according to the foregoing embodiment, two support guides 460 may of course be provided for supporting the drive mechanism 560. To mold the support guide 460, the molten resin may be supplied to the molds 860, 861 via a runner.

Features of the Embodiment

The cassette loading device embodying the invention has the following outstanding features.

1. The rotary gear 766 and the intermediate gear 768 are fitted to each other to hold the cassette 600 pressed against the cassette support 604, and the drive cam gear 740 is released from meshing engagement with the drive mechanism 560 upon completion of cassette loading, so that the load of holding the cassette 600 under pressure is not applied to the drive cam gear 740 after the cassette 600 has been completely held under pressure. This assures the drive cam gear 740 of smooth rotation and reduces the overall load of the magnetic recording-reproduction apparatus.

2. When the front mechanism 760 is attached to the drive mechanism 560, the large gear 767a is fitted to the cutout tooth 361a having a greater module than the other teeth. Accordingly, the gear for driving the tray 765 and the drive mechanism 560 can be positioned properly relative to each other without displacement. Consequently, the front mechanism 760 can be mounted on the chassis 100 with an improved work efficiency.

3. During cassette loading, the tray 765 descends while rotating about the projection 765b, i.e., about one end thereof toward the direction of advance, and the cassette 600 descends while being corrected from an inclined position to a horizontal position. This diminishes the amount of horizontal shift of the front end of the cassette 600, obviating the likelihood that the magnetic tape will be caught by the leading guide block 804 or like part of the tape running system which is positioned at the front end portion of the cassette 600, and the resulting likelihood that the cassette 600 will not be loaded on the cassette support 604 completely.

Further because the cassette 600 in the inclined position starts to descend, the region where the clearance between the cassette upper surface and the top plate 775 interconnecting the side plates 762, 763 decreases can be diminished. This assures the top plate 775 of strength while satisfying the need to make the magnetic recording-reproduction apparatus thinner.

4. The support guide 460 is provided by being molded inside the abutment plate 161 of the chassis 100 and thereafter being rotated to the specified position. This eliminates the need to fit the mold to the abutment plate 161 before molding, further obviating the difficulty to be otherwise encountered in molding owing to variations in the degree of abutment plate bending accuracy or to the presence of burrs.

5. When the cassette 600 is pressed against the cassette support 604, the pinion 767 of the front mechanism 760 engages with the toothed edge 361 of the slide plate 360 and the rack portion 572 of the holder 561. The drive mechanism 560 is therefore capable of withstanding the great force of holding the cassette 600 under pressure unlike the case wherein the drive mechanism 560 slidingly moves with the toothed edge 361 only in mesh with the pinion.

What is claimed is:

1. A cassette loading device having a front mechanism for loading a cassette onto a chassis and unloading the cassette therefrom by slidingly moving a tray along guide grooves formed in side plates with the cassette placed on the tray, the cassette loading device comprising:

a drive cam gear rotatably supported by the chassis and integrally formed with a cylindrical portion, the cylindrical portion having a cutout in the side face thereof;

a holder having a projecting tooth engageable in the cutout during cassette loading and disengageable from the cutout upon completion of the cassette loading and rack teeth meshable with a pinion attached to the front mechanism;

a rotary gear attached to a side portion of the front mechanism and connected to the tray; and an intermediate gear meshing with the rotary gear and the pinion, one of the intermediate gear and the rotary gear being provided on a side portion thereof with a protuberance having a smooth curved face, one of the rotary gear and the intermediate gear being provided on a side portion thereof with a recessed portion fittable to the protuberance to constitute a Geneva stop when the cassette is in a completely loaded position, wherein the chassis is provided at one side thereof with an abutment plate generally orthogonal to the plane of the chassis, and a support guide holding a drive mechanism for slidingly moving the front mechanism is caused to protect from inside the chassis to the outside of the chassis through a cutout opening formed in the abutment plate, the support guide having an engaging piece engageable with an edge of the cutout opening, the support guide extending from a support portion rotatably provided on a lower surface of the chassis, the support guide and the support portion being molded on the chassis integrally with a fitting piece rotatably extending through the chassis and joined to the support portion and with a retaining piece in contact with an upper surface of the chassis and joined to an end of the fitting piece, the chassis having a through hole permitting an outer-end upper portion of the support guide to fit in and coinciding with a fitting position of the support guide as reversely rotated into the inside of the abutment plate, the support guide being caused to project from the abutment plate by being molded at the fitting position and thereafter being rotated about the fitting piece with its upper portion released from the through hole.

2. A cassette loading device as defined in claim 1, wherein the holder and the rack teeth include a tooth having a greater module than the other teeth thereof, and the pinion is provided at the side portion of the front mechanism and coupled to the tray, the pinion having a toothed outer periphery formed in a portion thereof with a large tooth fittable to the cutout tooth, the large tooth being fittable to the cutout tooth only when the tray has been completely retracted in a cassette discharge direction.

3. A cassette loading device as defined in claim 1, wherein a first projection and a second projection positioned away from the first projection toward a cassette loading direction are provided on a side portion of the tray and fitting in a first guide groove and a second guide groove respectively, the second guide groove including a slanting groove gently slanting upward from a cassette insertion side toward the cassette loading direction and a vertical groove extending vertically downward from the upper end of the slanting groove toward the chassis, the first groove including another slanting groove extending approximately in parallel to the slanting groove and having approximately the same length as the slanting groove, a descent groove extending from the upper end of the slanting groove toward the cassette insertion side and a vertical groove extending downward from the lower end of the descent groove, the slanting, descent and vertical grooves being in communication with one another, the tray being movable downward with its inclination corrected by rotating about the second projection when the first projection slides down the descent groove.

* * * * *